(12) United States Patent
Parry et al.

(10) Patent No.: US 9,347,456 B2
(45) Date of Patent: May 24, 2016

(54) NON-METALLIC VERTICAL TURBINE PUMP

(75) Inventors: William W. Parry, Bethlehem, PA (US); Erik Burachinsky, Boonton, NJ (US)

(73) Assignee: MPC, Inc., Wilmington, DE (US)

( * ) Notice: Subject to any disclaimer, the term of this patent is extended or adjusted under 35 U.S.C. 154(b) by 653 days.

(21) Appl. No.: 13/211,929

(22) Filed: Aug. 17, 2011

(65) Prior Publication Data

US 2012/0213632 A1     Aug. 23, 2012

Related U.S. Application Data

(60) Provisional application No. 61/374,452, filed on Aug. 17, 2010.

(51) Int. Cl.
| | |
|---|---|
| *F04D 29/02* | (2006.01) |
| *F04D 13/08* | (2006.01) |
| *B29C 33/52* | (2006.01) |
| *B29C 70/30* | (2006.01) |
| *B29D 99/00* | (2010.01) |
| *F04D 29/22* | (2006.01) |

(Continued)

(52) U.S. Cl.
CPC .............. *F04D 29/026* (2013.01); *B29C 33/52* (2013.01); *B29C 70/30* (2013.01); *B29D 99/0025* (2013.01); *F04D 13/08* (2013.01); *F04D 29/2227* (2013.01); *F04D 29/448* (2013.01); *B29L 2031/7504* (2013.01); *F05C 2253/04* (2013.01)

(58) Field of Classification Search
USPC ................ 415/182.1, 196, 197, 198.1, 199.1, 415/199.2, 200, 208.1, 211.2, 901, 903
See application file for complete search history.

(56) References Cited

U.S. PATENT DOCUMENTS

| | | | | |
|---|---|---|---|---|
| 2,491,751 | A | * | 12/1949 | McGee ........................ 415/135 |
| 3,433,145 | A | * | 3/1969 | Baker ..................... F04D 25/14 |
| | | | | 348/E11.011 |

(Continued)

FOREIGN PATENT DOCUMENTS

| | | |
|---|---|---|
| JP | 8224748 | 9/1996 |
| JP | 2004-090047 | 3/2004 |
| WO | WO 2011/063333 | 5/2011 |

OTHER PUBLICATIONS

International Patent Application No. PCT/US2011/048018: Notification of Transmittal of the International Preliminary Report on Patentability dated Dec. 3, 2012, 36 pages.

(Continued)

*Primary Examiner* — Dwayne J White
*Assistant Examiner* — Justin Seabe
(74) *Attorney, Agent, or Firm* — Baker & Hostetler LLP

(57) ABSTRACT

A non-metallic vertical turbine pump and a method of manufacturing same are provided. In accordance with one embodiment, the vertical turbine pump can include a motor, and a drive shaft coupled to the motor for rotation, a casing with a mixed flow diffuser including a diffuser hub and diffuser vanes that project out from the diffuser hub, and a mixed flow impeller configured to rotatably fit inside the casing, having an impeller hub, impeller vanes, extending from the hub, and a front and a back shroud connected to opposing ends of the impeller vanes. At least one of the mixed flow impeller and the mixed flow diffuser can be made of a non-metallic material and is a singular homogenous component.

14 Claims, 29 Drawing Sheets

(51) Int. Cl.
*F04D 29/44* (2006.01)
*B29L 31/00* (2006.01)

(56) References Cited

U.S. PATENT DOCUMENTS

| | | | | |
|---|---|---|---|---|
| 3,438,329 | A | * | 4/1969 | Fuller ................. 415/199.3 |
| 3,936,221 | A | * | 2/1976 | Lobanoff ................. 415/200 |
| 4,865,519 | A | * | 9/1989 | Diankui et al. ............ 415/210.1 |
| 5,071,317 | A | * | 12/1991 | Leach ................. 415/199.2 |
| 5,496,150 | A | * | 3/1996 | Claxton et al. ............. 415/229 |
| 5,538,395 | A | * | 7/1996 | Hager ................. 416/144 |
| 5,540,553 | A | * | 7/1996 | Goto et al. ............. 416/241 A |
| 5,989,664 | A | | 11/1999 | Takayama et al. |
| 6,547,210 | B1 | | 4/2003 | Marx et al. |
| 6,881,030 | B2 | * | 4/2005 | Thut ................. 415/200 |
| 2008/0031731 | A1 | | 2/2008 | Orban et al. |
| 2008/0101924 | A1 | | 5/2008 | Orban et al. |
| 2009/0297344 | A1 | * | 12/2009 | Hill et al. ................ 415/208.1 |

OTHER PUBLICATIONS

Church, "Centrifugal Pumps and Blowers" John Wiley and Sons, Inc., © 1944, 3 pages.

Stepanoff, "Centrifugal and Axial Flow Pumps", $2^{nd}$ Edition, Krieger Publishing Company, © 1957, 6 pages.

* cited by examiner

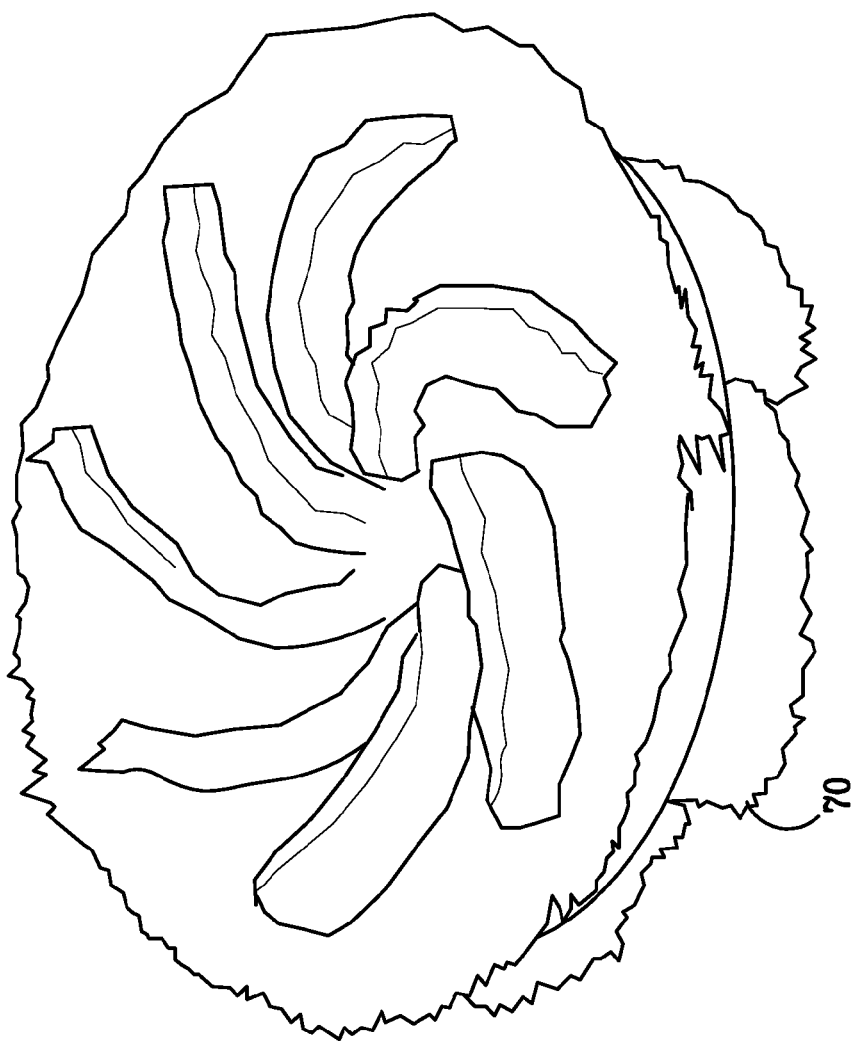

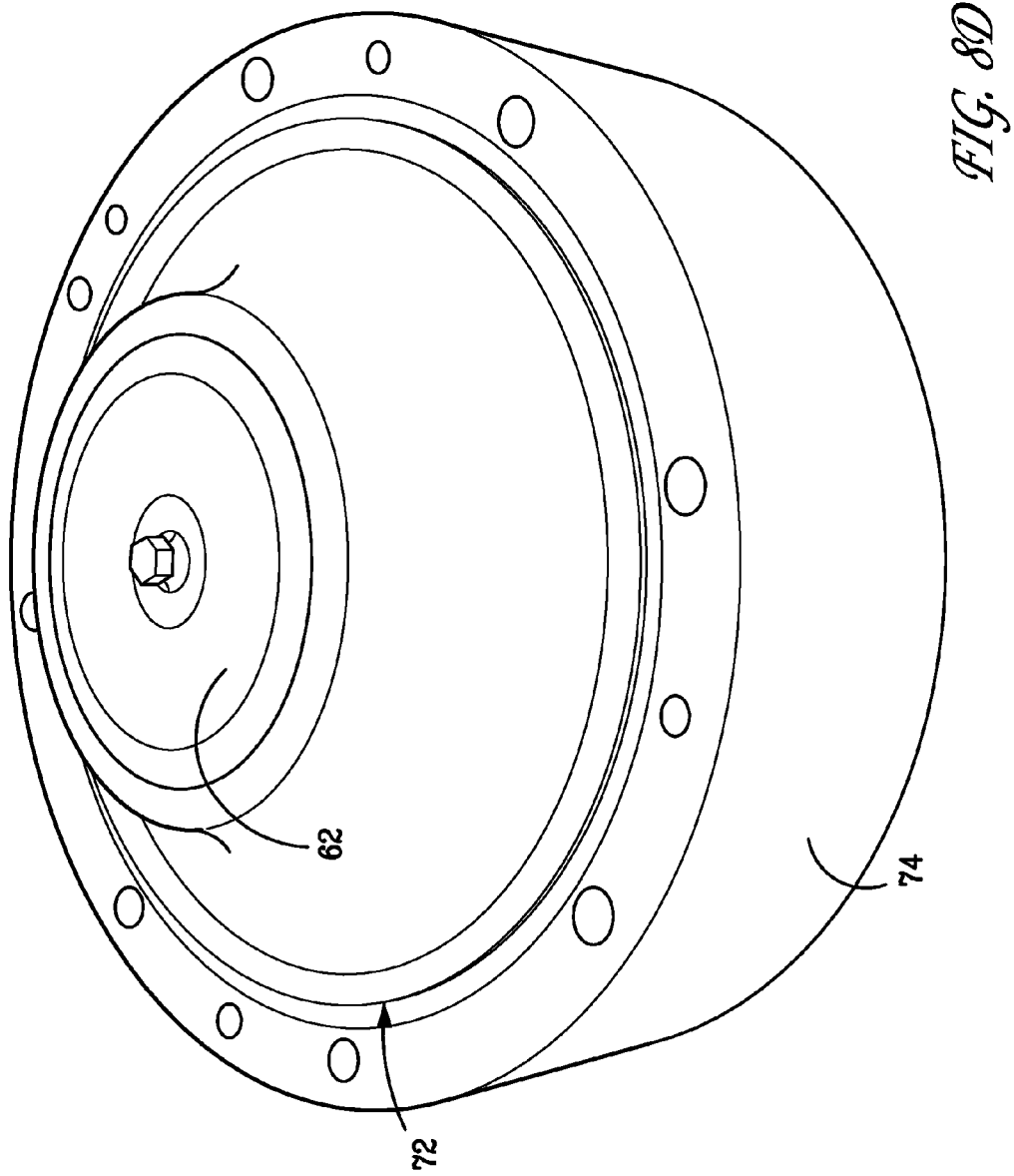

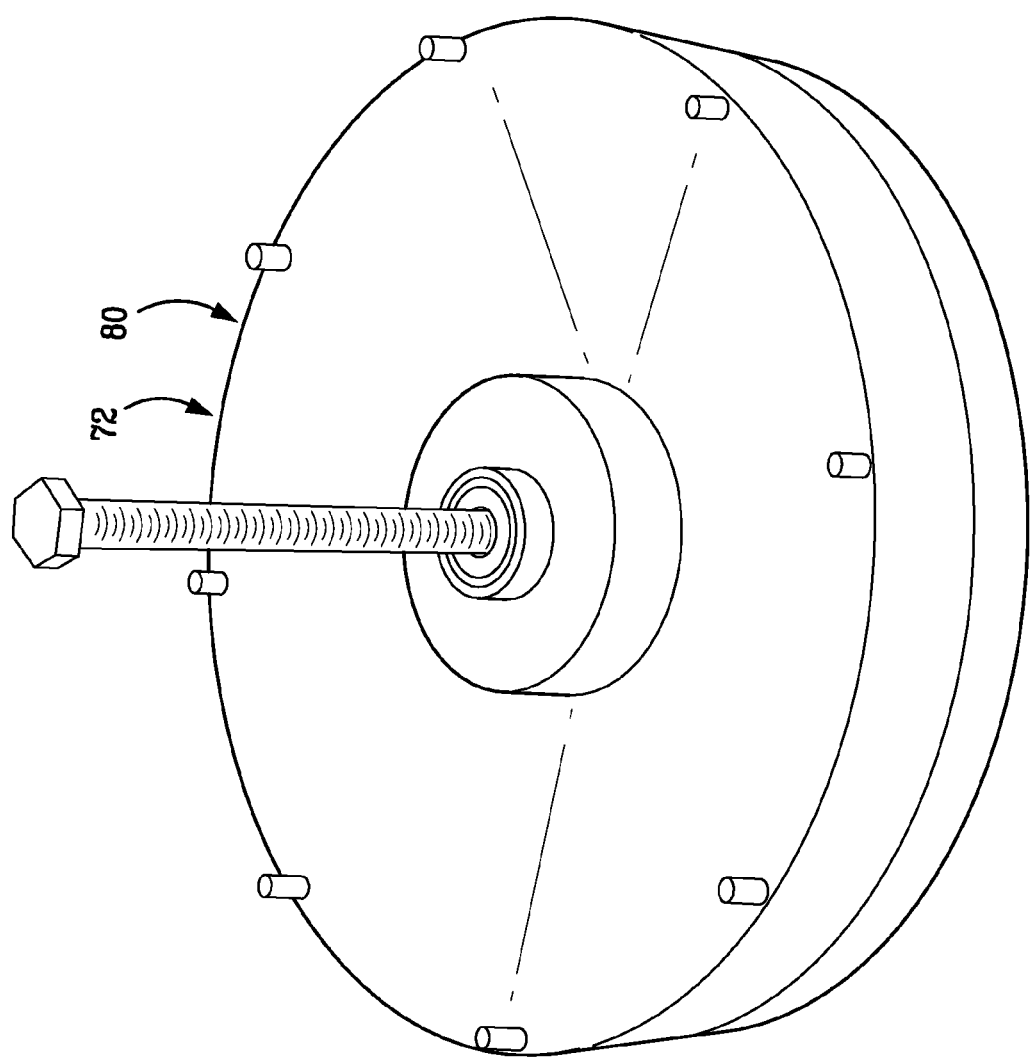

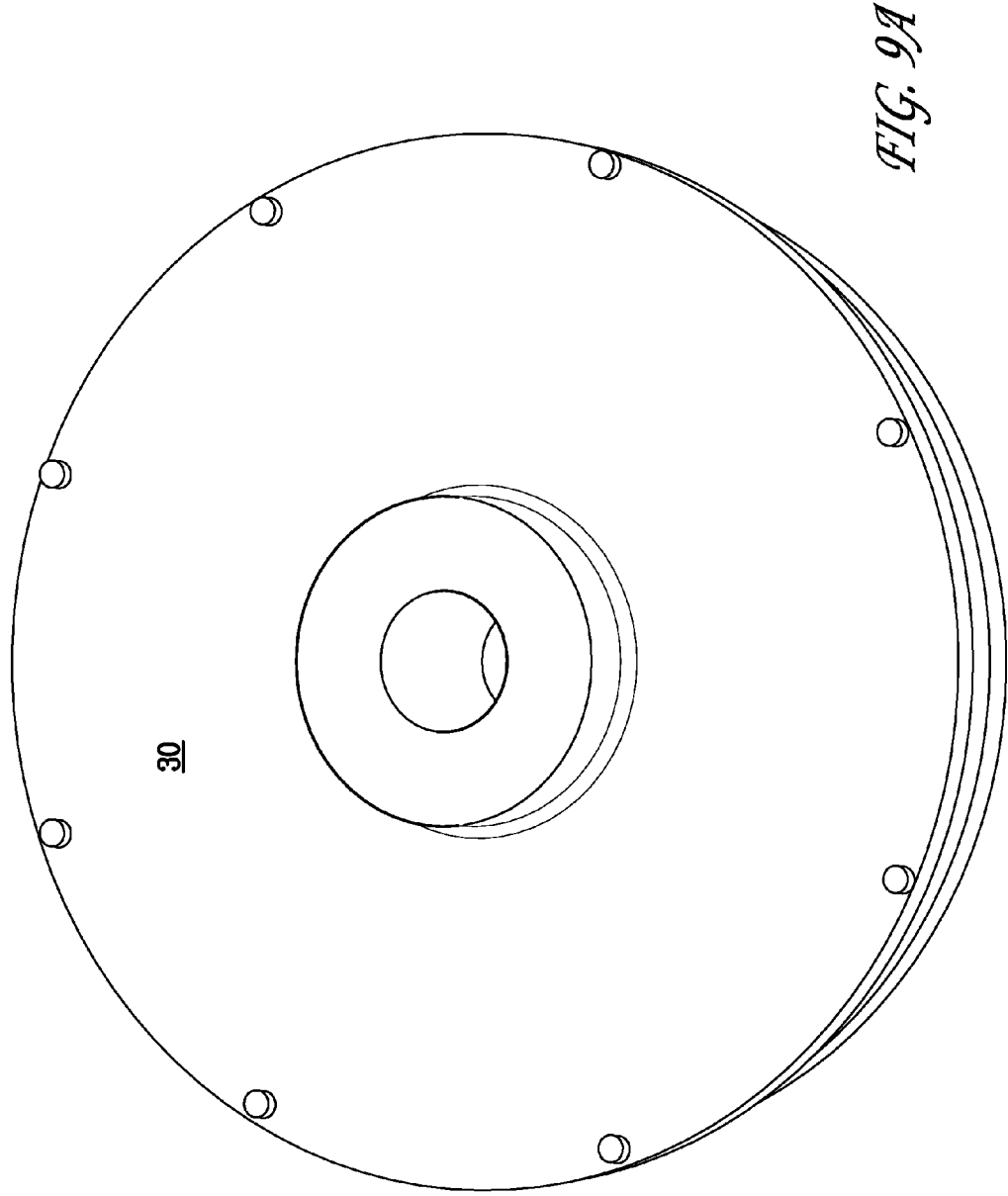

NON-METALLIC VERTICAL TURBINE PUMP

CROSS-REFERENCE TO RELATED APPLICATIONS

This claims the benefit of U.S. Patent Application Ser. No. 61/374,452 filed on Aug. 17, 2010, the disclosure of which is hereby incorporated by reference as if set forth in its entirety herein.

BACKGROUND

Conventional fluid (e.g., water) pumps can be orientated in either a vertical or horizontal position, based on the direction of the shaft. Vertical pumps, units with a vertical shaft configuration, can be further segmented into either Dry or Wet pit construction and subsequently into either volute pumps, propeller pumps or vertical turbine pumps. Vertical turbine pumps include a motor that is mounted on some type of pedestal or motor support attached to the upper surface of a motor attachment member. The pump shaft can be either directly attached or coupled to the motor and extends downward toward the casing and impeller through a column support or vertical pipe arrangement. Depending upon the style of vertical pump the casing can be either a volute type (typically single stage with a scroll diffuser), or a vaned diffuser configuration (typically multi-stage). The impeller includes a plurality of impeller vanes that rotate with the motor and shaft increasing the exit velocity of the fluid. The impeller also creates a pressure differential while pumping the water from an inlet or suction end to an outlet or discharge end. The impeller of volute style pumps generally includes a radial impeller vane configuration which turns the fluid 90 degrees within the casing so as to direct the pumped fluid into the casing discharge, which is perpendicular to the casing suction. The impeller of a vertical turbine pump generally includes a mixed flow impeller vane configuration which turns the fluid greater than 90 degrees into the vaned diffuser casing, which continues turning the fluid until it is discharged 180 degrees from the inlet. The impeller of propeller pumps (typically single stage) does not change the direction of fluid flow and the fluid exits the impeller and casing 180 degrees from the inlet. Vertical pumps are used in several applications. For instance, water can be pumped up from the water table in agricultural irrigation. Additionally, water can be pumped from a river or lake for use in power plants. Additionally still, pumps can be used to pump water in reverse osmosis applications.

Propeller and vertical turbine pumps had been made out of a metallic material for ease of manufacturability. Unfortunately, the associated corrosiveness of metallic components affected the longevity of such pumps. Accordingly, volute pumps, which have been manufactured out of corrosion resistant non-metallic materials, are utilized when a vertical pump is used and corrosion is an issue.

Propeller and vertical turbine pumps include a vaned casing which contains a plurality of diffuser vanes disposed in the casing at a location downstream of the impeller. Similar to a volute, the diffuser vanes increase the flow area along the direction of fluid flow, thereby decreasing the velocity of fluid flow through the casing and increasing the head pressure. Furthermore, the impeller vanes of vertical turbine pumps are twisted so as to define combined axial and radial flow characteristics. Due to the complex geometry of the propeller and vertical turbine pump components, conventional propeller and vertical turbine pumps are not currently made from fiberglass reinforced molded non-metallic materials, because of to the inability to provide sufficient molds to manufacture these non-metallic parts. Specifically, because diffusers have two or more passages, diffusers have not been formed from a single part made of a homogenous material.

Attempts have been made, for instance by Simsite Pump Valve Co., to create vertical turbine pumps out of a single block forged of non-metallic corrosion resistant materials. However, the complex pump components, such as the impeller and diffuser, are machined from these single block forgings, without fiberglass reinforcement, utilizing multiple axis machine tools which limit the design and size of these components due to "line of sight" machining restrictions. Furthermore, current vertical turbine pumps that have certain non-metallic components also include certain wetted components that are made of metal, such as the discharge elbow.

What is therefore desired is an improved non-metallic vertical turbine pump manufactured from corrosion resistant fiberglass reinforced resins with parts which can be molded into a homogenous solid shape, and contain reduced wetted metal parts.

SUMMARY

In accordance with one embodiment, a vertical turbine pump can include a motor and a drive shaft coupled to the motor for rotation, a casing with a mixed flow diffuser including a diffuser hub and diffuser vanes that project out from the diffuser hub, and a mixed flow impeller configured to rotatably fit inside the casing, having an impeller hub, impeller vanes, extending from the hub, and a front and a back shroud connected to opposing ends of the impeller vanes. At least one of the mixed flow impeller and the mixed flow diffuser can be made of a non-metallic material and is a singular homogenous component. The non-metallic material can be fiberglass reinforced and can exhibit strength similar to metallic components but has improved corrosion resistance. The pump can include a discharge head including a discharge column, an elbow and a stuffing box holder that extends into the elbow at a joint and a non-metallic material that covers the joint. The pump can also have a metallic mount that supports the motor and is disposed between the elbow and discharge column and at least one insert at the interface between the elbow and the column.

In accordance with another embodiment, a non-metallic vertical turbine pump can be made using a method of molding at least a portion of the pump that includes providing a core, fabricating cutouts in the core, introducing a non-metallic composite material into the cutouts and surrounding opposed ends of the core, and removing the core. The step of fabricating can include machining the cutouts in the core. The composite material can be a fiberglass reinforced resin wherein the fiberglass is oriented so as to provide a desired level of internal strength and bonding and the resin comprises a vinyl-ester or epoxy. The core can have a melting temperature that is lower than the composite material. The core can also be a wax that is formed by introducing wax into a silicon rubber mold.

BRIEF DESCRIPTION OF THE DRAWINGS

The foregoing summary, as well as the following detailed description of the various embodiments of the application, will be better understood when read in conjunction with the appended drawings. For the purposes of illustrating the various embodiments of the disclosure, reference is made to the drawings. It should be understood, however, that the application is not limited to the precise arrangements and instrumentalities illustrated in the drawings, in which:

FIG. 8B is an illustration showing fiberglass reinforcement fibers introduced into and around the core illustrated in FIG. 8A;

FIG. 8D is a perspective view of a molded construct after the introduction and hardening of a resin inside the mold cavity;

FIG. 8F is a perspective view of the molded construct after the removal of flashing;

FIGS. 9A-C are perspective views of the as-molded impeller after removal of the core;

DETAILED DESCRIPTION

Figure 1A:
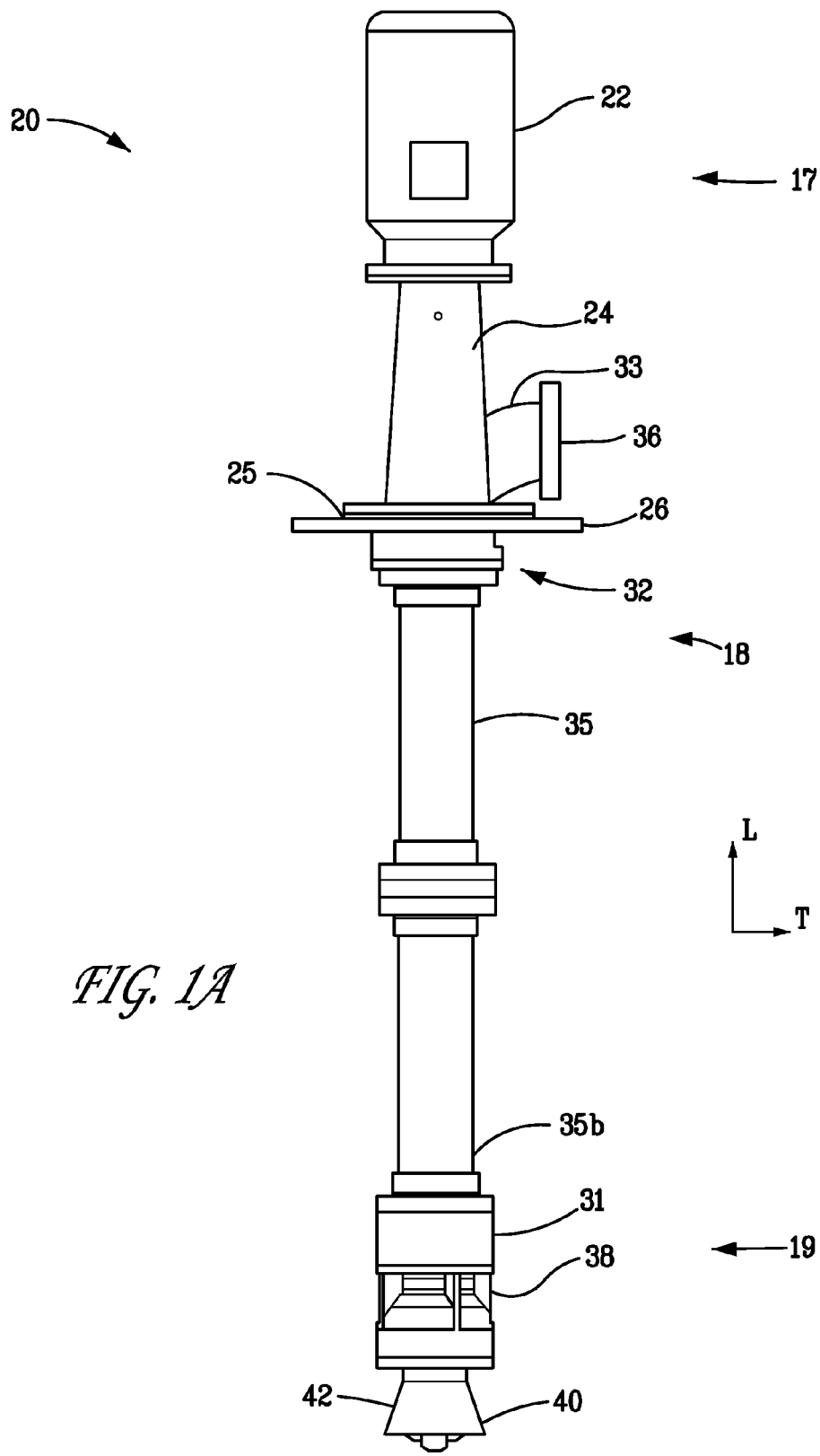
FIG. 1A is a schematic perspective view of a vertical turbine pump constructed in accordance with one embodiment, including a proximal portion that includes a motor and drive shaft which are attached to an intermediate portion that includes a discharge pipe connected to the motor by a motor attachment assembly, and a distal portion attached to the intermediate portion via the discharge pipe that includes a casing that retains an impeller, a diffuser, and a suction bell.
Figure 1B:
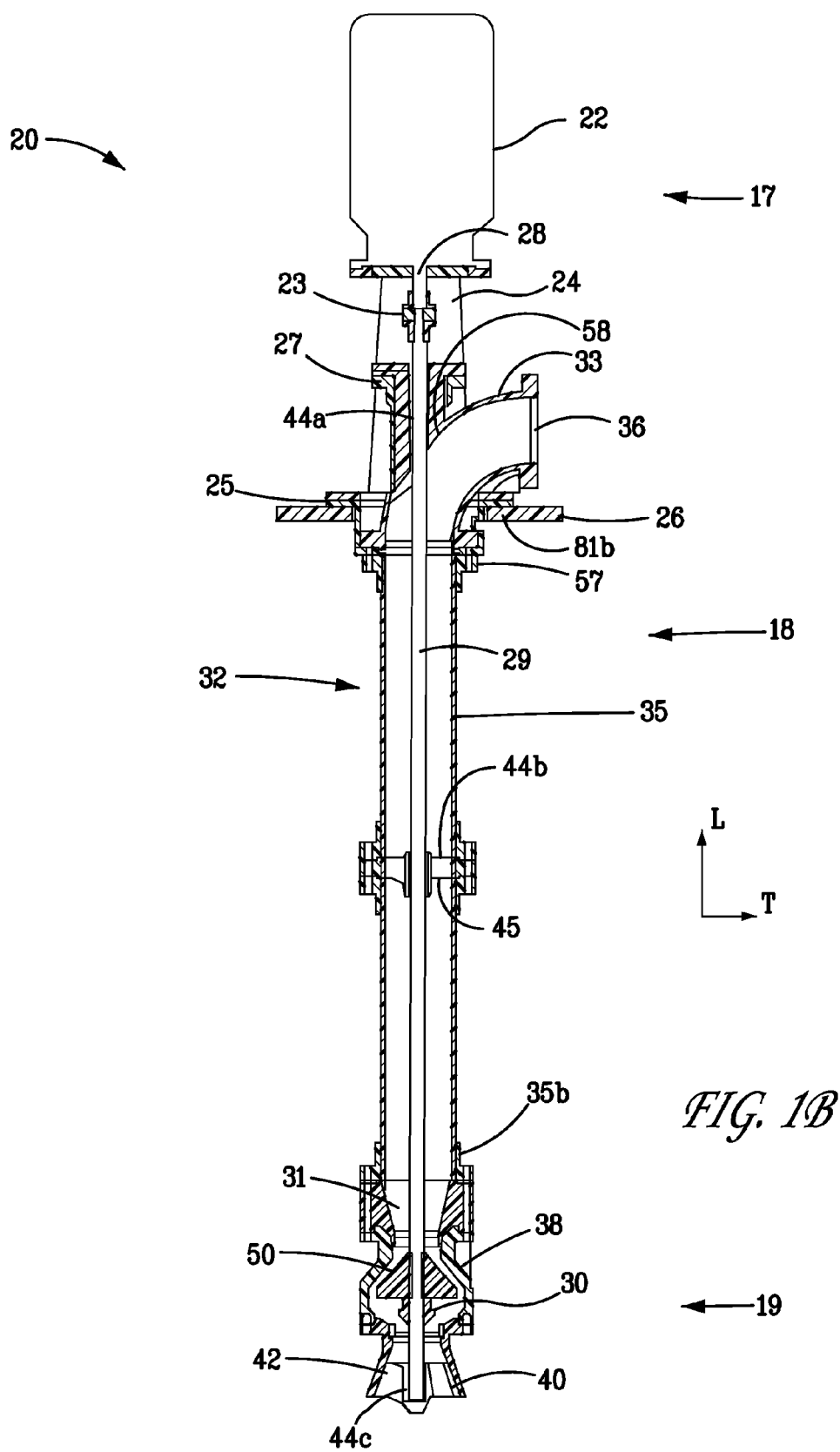
FIG. 1B is a schematic sectional elevation view of the vertical turbine pump illustrated in FIG. 1A.

Referring to FIGS. 1A-B, a vertical turbine pump 20 is elongate substantially along a longitudinal direction L that extends parallel to an L-axis, and further extends along a lateral direction A that is parallel to an A-axis and is substantially perpendicular to the longitudinal direction L, and a transverse direction T extends parallel to a T-axis and is substantially perpendicular to both the longitudinal direction L and the lateral direction A. It should be appreciated that reference to an axial direction can be used synonymously with the longitudinal direction L unless otherwise indicated, and reference to a radial direction can be used synonymously with a direction that extends substantially perpendicular to the longitudinal direction L, such as the lateral direction A, unless otherwise indicated.

The vertical turbine pump 20 can include a proximal portion 17 at an upper end that defines a fluid discharge end, a distal portion 19 at an opposed lower end that is spaced from the proximal portion 17 along the longitudinal direction L and defines a fluid intake end, and an intermediate portion 18 disposed between the proximal portion 17 and the distal portion 19. The proximal portion 17 can include a motor 22 and drive shaft 28 that extends from and is rotationally coupled to the motor 22. During operation of the pump 20, the motor 22 actuates the drive shaft 28 to rotate about the L-axis. The motor 22 and drive shaft 28 of the proximal portion 17 can be connected to the intermediate portion 18 as described below. The intermediate portion 18 can include a motor support 24, an attachment member 25, a driven shaft 29, and a discharge pipe 32. The discharge pipe 32 can include a column 35 and an elbow 33 that curves radially so as to define an outlet 36.

The motor support 24 and attachment member 25 can be configured to attach to and secure the motor 22 to the discharge pipe 32 such that the motor 22 is held in place above the discharge pipe 32 during operation of the vertical turbine pump 20. The attachment member 25 can be configured to connect the motor support 24 to the discharge pipe 32. In one embodiment, the intermediate portion 18 can include a mounting plate 26 that can be secured to the attachment member 25. The mounting plate 26 can be used to secure the vertical turbine pump 20 in a desired location.

Figure 2:
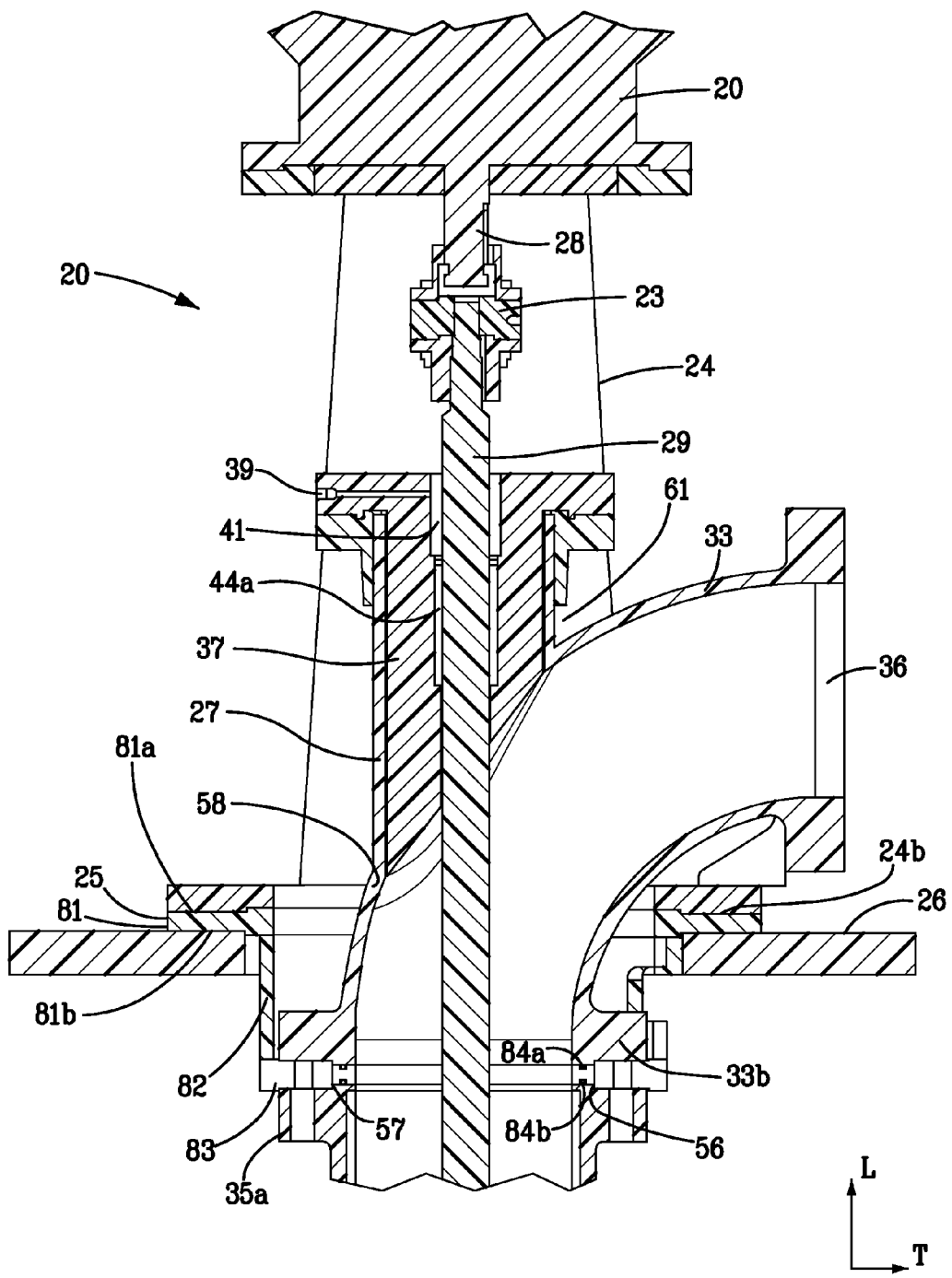
FIG. 2 is an enlarged sectional partial perspective view of the proximal and intermediate portions of the vertical turbine pump illustrated in FIG. 1A the discharge elbow of the vertical turbine pump illustrated in FIG. 1A.

Referring to FIGS. 1B and 2, the intermediate portion 18 can further include a coupling 23 that rotationally couples the drive shaft 28 of the proximal portion 17 to the driven shaft 29, such that during operation of the pump 20, rotation of the drive shaft 28 about the L-axis causes rotation of the driven shaft 29 about the L-axis. The driven shaft 29 extends axially in the longitudinal direction L from the coupling 23 through the distal portion 19 of the pump 20.

The elbow 33 can define an opening 58 that receives the driven shaft 29. As shown the driven shaft 29 can pass through the opening 58 distally of the coupling 23 at a joint 61 that fixedly connects the opening 58 of the elbow 33 to a stuffing box support 27. The stuffing box support 27 can extend proximally upward from the joint 61 around the driven shaft 29. The stuffing box support 27 can include a stuffing box 37 which houses a packing or mechanical seal 41 against the driven shaft 29 so as to prevent fluid flowing through the elbow 33 is from passing through the opening 58 and into the stuffing box 37. In one embodiment, the packing or mechanical seal 41 can be configured to allow some flow of fluid from the elbow 33 to pass through the opening 58 to the bearing 44a, the fluid providing lubrication for the bearing 44a. In another embodiment, the stuffing box 37 can include an injection port 39 that configured to deliver lubrication to the bearing 44a.

The upper portion of the attachment member 25 can have a proximal flange 81 with a proximal surface 81 a that mates with a distal surface 24b of the motor support 24. The radially inward portion of the proximal flange 81 can mate with a lateral member 82 of the attachment member 25. The lateral member 82 can extend downward in the longitudinal direction L to a fixation member 83 of the attachment member 25. The fixation member 83 can extend radially, which can be used interchangeably herein with laterally, inward from the lateral member 82 to define an opening 56 disposed between a distal end 33b of the elbow 33 and a proximal end 35a of the column 35. The vertical turbine pump 20 can include an insert 57 that is configured to fit within the opening 56 such that fluid flowing through the discharge pipe 32 contacts the insert 57 and is blocked from coming into contact with the attachment member 25. The vertical turbine pump 20 can include one or more, such as a pair of, elastomeric o-rings 84a-b that secure the insert 57 between the distal end 33b of the elbow 33 and the proximal end 35a of the column 35.

The column 35 of the discharge pipe 32 can extend distally from the attachment member 25 to the distal portion 19 of the vertical turbine pump 20. As shown, the column 35 can be a tubular member that defines a bore 45 extending through the column 35. The driven shaft 29 can be disposed within the bore 45 of the column. The column 35 can further include a bearing 44b that extends radially inward from the column 35 to support the driven shaft 29. A proximal end 35a of the column 35 can be coupled to a distal end 33b of the elbow so that in operation, fluid flows from the distal portion 19 of the pump 20 through the column 35 and elbow 33 of the discharge pipe 32 and out the outlet 36 of the elbow 33.

Figure 3A:
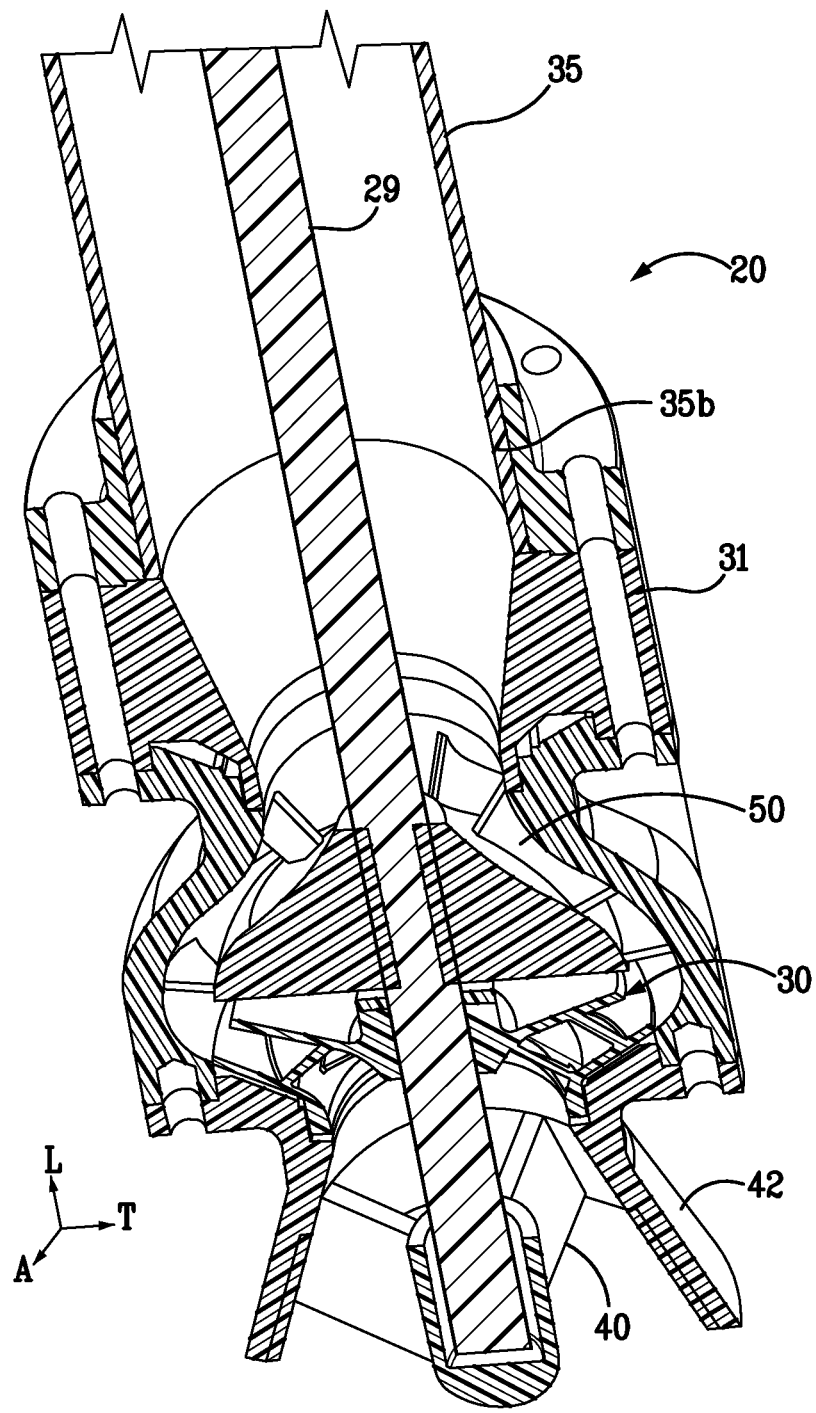
FIG. 3A is a schematic cross-sectional perspective view of a portion of the vertical turbine pump illustrated in FIG. 1A, including the distal portion and the distal end of the discharge pipe.
Figure 3B:
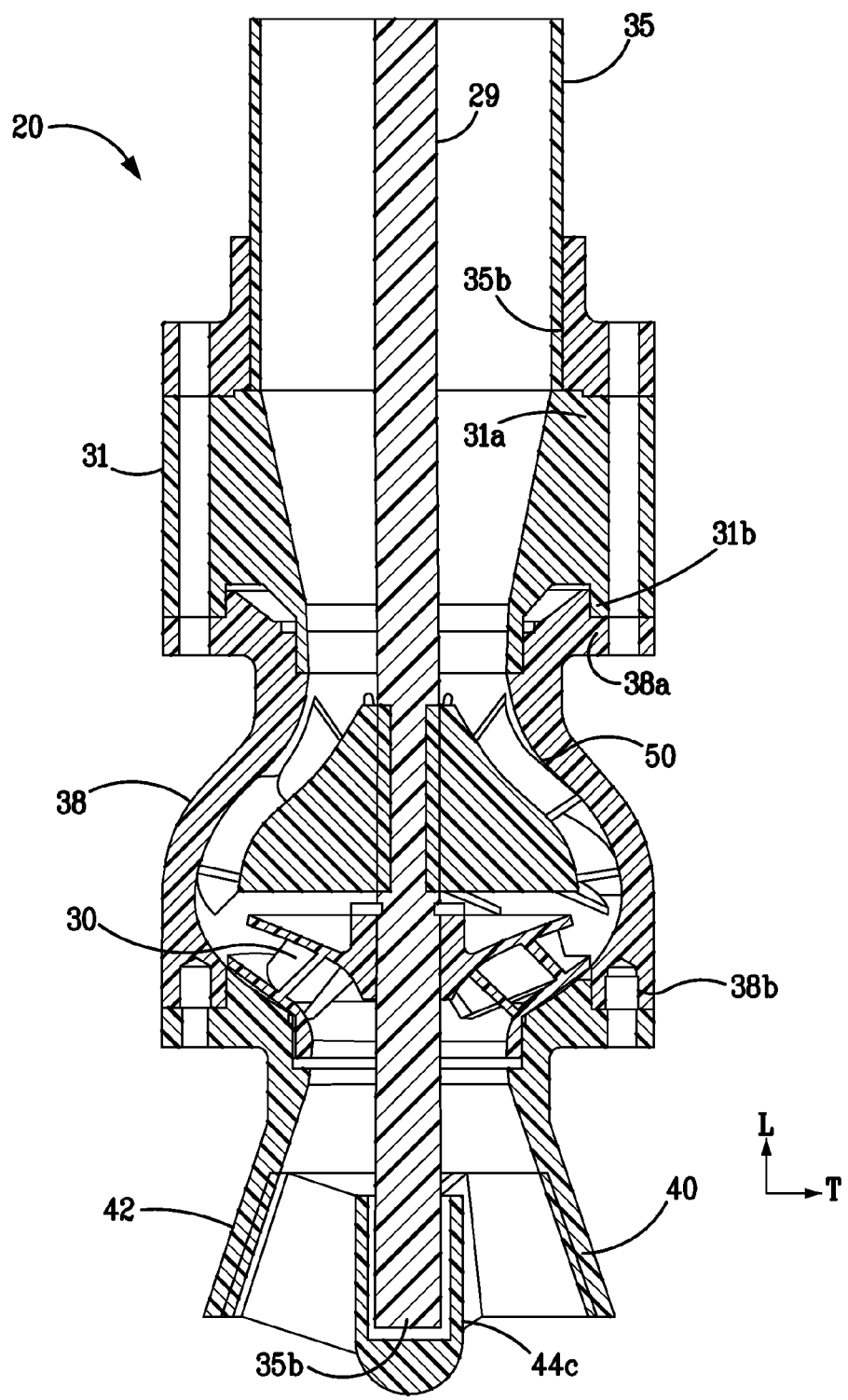
FIG. 3B is a schematic sectional elevation view of the distal portion and the distal end of the discharge pipe illustrated in FIG. 3A.

Referring to FIGS. 3A and 3B, column 35 defines a distal end 35b that can connect to the distal portion 19 of the pump 20. A spacer 31 disposed at an upper end of the distal portion 19 can be configured to mate with the distal end 35b of the column 35. The distal portion 19 can further include a casing 38, the casing having an upper end 38a that is affixed to a lower end 31b of the spacer 31. Additionally, the distal portion 19 can include an intake 40. The intake 40 is configured to draw fluid into the distal portion 19 of the pump 20. In one embodiment the intake 40 can be in the form of a suction bell 42 affixed to a lower end 38b of the casing 38. The intake 40 can be angularly offset with respect to the outlet 36. As shown in FIG. 1B the intake 40 and the outlet 36 can be offset such that they are substantially perpendicular to each other.

Referring again to FIGS. 3A and 3B, the suction bell 42 can include a bearing 44c that slidably supports the driven shaft 29 at distal end 29b such that bearing 44c remains stationary within the suction bell 42 as the driven shaft 29 rotates about the L-axis. An impeller 30, which can be configured to rotatably fit within the casing 38, is rotationally coupled to the driven shaft 29, such that the impeller 30 rotates along with the driven shaft 29. As shown the impeller 30 can be disposed proximal to the bearing 44c, such that rotation of the driven shaft 29 causes the impeller 30 to rotate within the casing 38. The vertical turbine pump 20 can include a diffuser 50 that may be integral with the casing 38 at a location proximal to the impeller 30. The diffuser 50 can be slidably coupled to the driven shaft 29 proximal to the impeller 30 such that the diffuser 50 remains stationary within the casing 38 as the driven shaft 29 rotates. During operation of the pump 20, fluid can flow proximally from the intake 40 through the casing 38, through the spacer 31, and into the discharge pipe 32. Fluid can be drawn into intake 40 when the motor 22 drives the shafts 28 and 29, thereby causing the shafts 28 and 29 to rotate about the L-axis, which in turn causes the impeller 30 to rotate about the L-axis.

Referring to FIGS. 4A, 4B, 5A, and 7, the impeller 30 can include a hub 46 that is configured to be mounted onto the driven shaft 29 so as to rotate about an axis of rotation, which can be defined by the longitudinal L-axis. A front shroud 47 and a back shroud 49 can extend radially out from the hub 46, and are axially spaced from each other along the longitudinal direction L. A plurality of circumferentially spaced impeller vanes 48 can extend between the front and back shrouds 47 and 49. At least one up to all of the impeller vanes 48 can be twisted about a corresponding axis that is defined by a first directional component and a second directional component that is angularly offset to (for instance perpendicular to) the first directional component, wherein the first directional component is defined by the axis of rotation and the second directional component is defined by a direction substantially perpendicular to the axis of rotation. Thus, the impeller vanes 48 can be referred to as mixed flow vanes. Likewise, the impeller 30 can be referred to as a mixed flow impeller. Because both axial ends of the impeller vanes 48 attach to a respective shroud, such as the front shroud 47 and back shroud 49, the impeller 30 can be referred to as a closed impeller. During operation, rotation of the impeller 30 causes the vanes 48 to create a negative pressure in the suction bell 42 that draws fluid, such as water, through the impeller 30 into the casing 38.

Figure 4A:
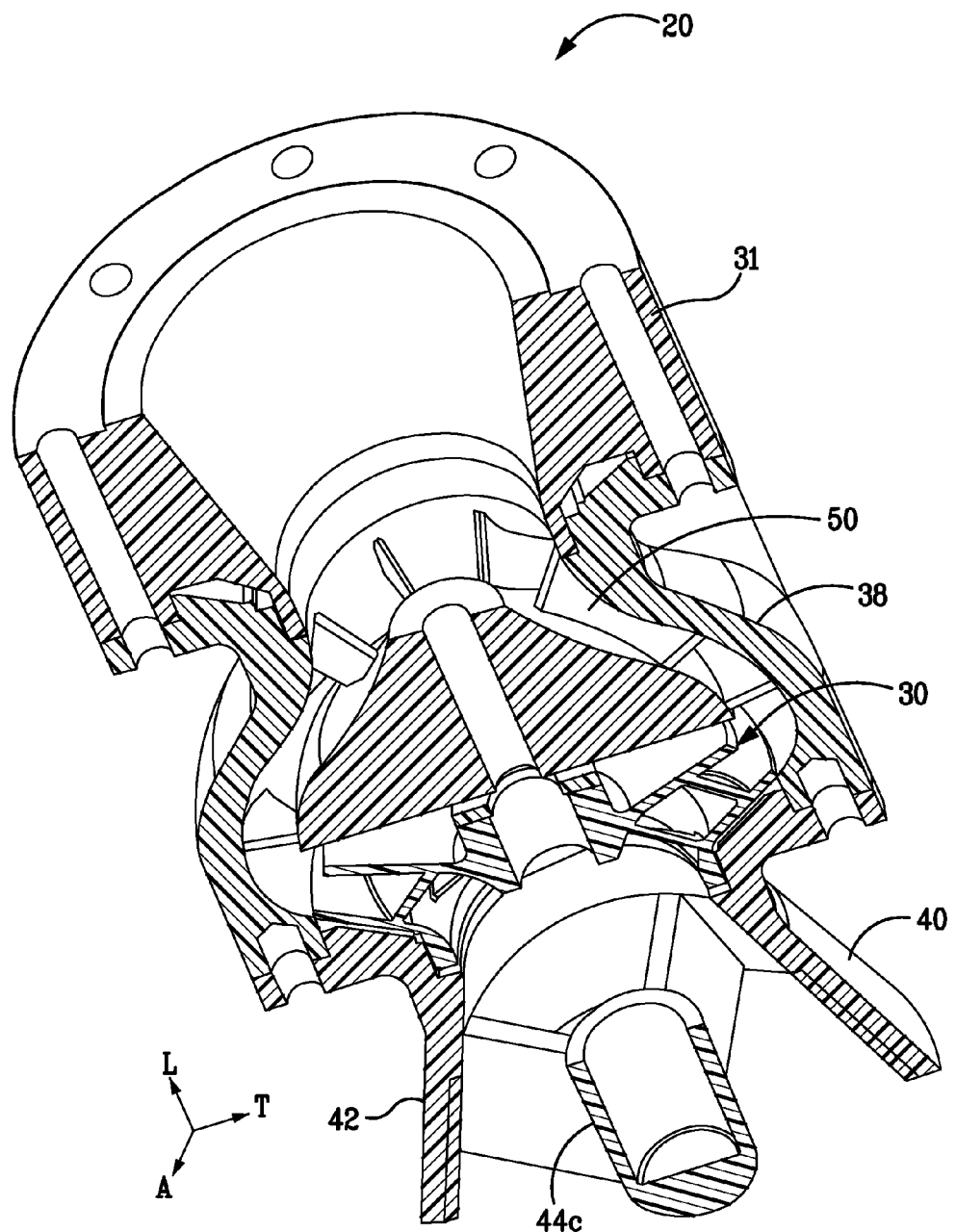
FIG. 4A is an enlarged schematic perspective view of the distal portion of the vertical turbine pump illustrated in FIG. 1A, including the casing, impeller, diffuser, and suction bell.
Figure 4B:
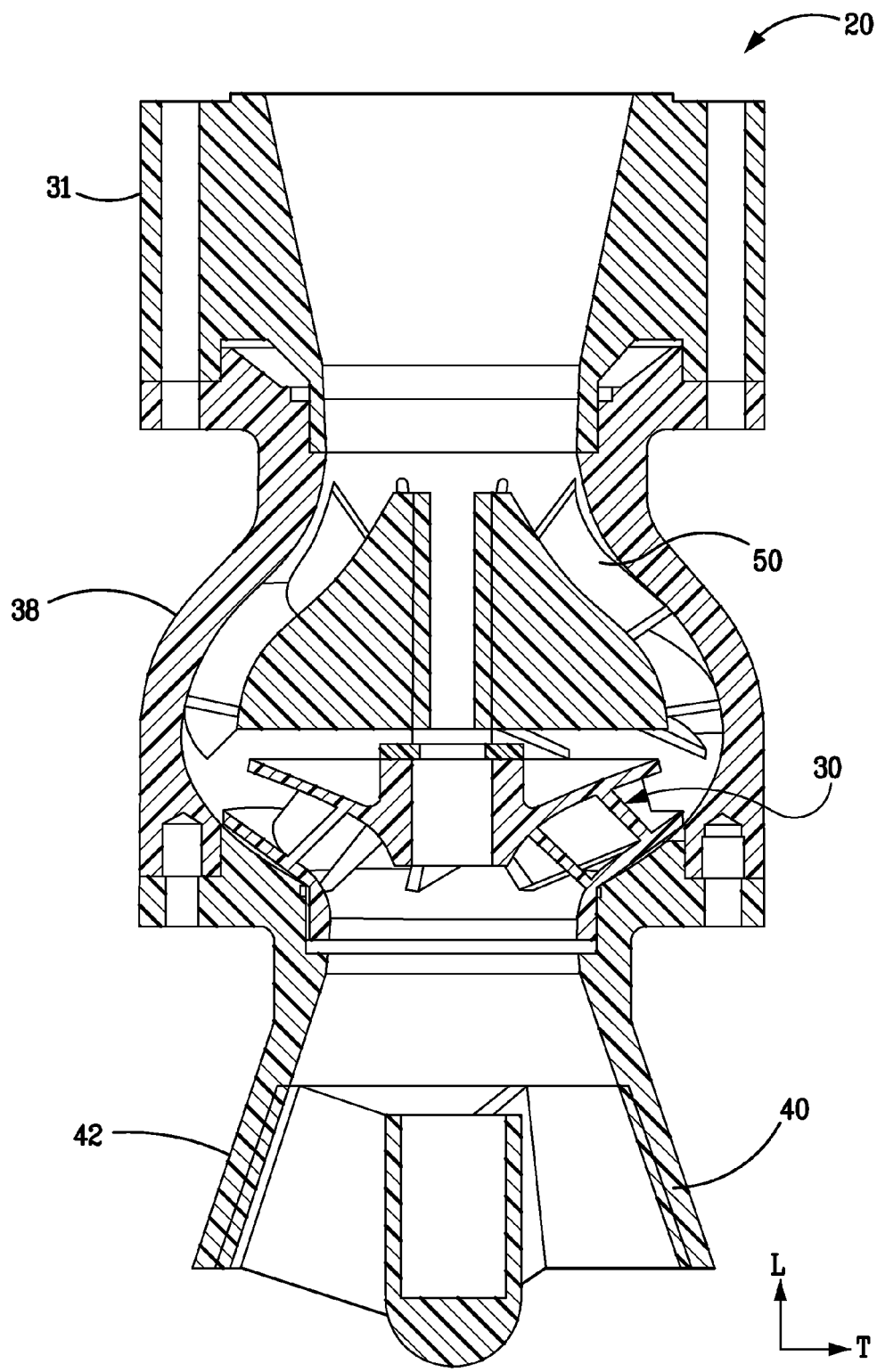
FIG. 4B is a schematic sectional elevation view of the casing, impeller, diffuser, and suction bell illustrated in FIG. 4A.
Figure 5A:
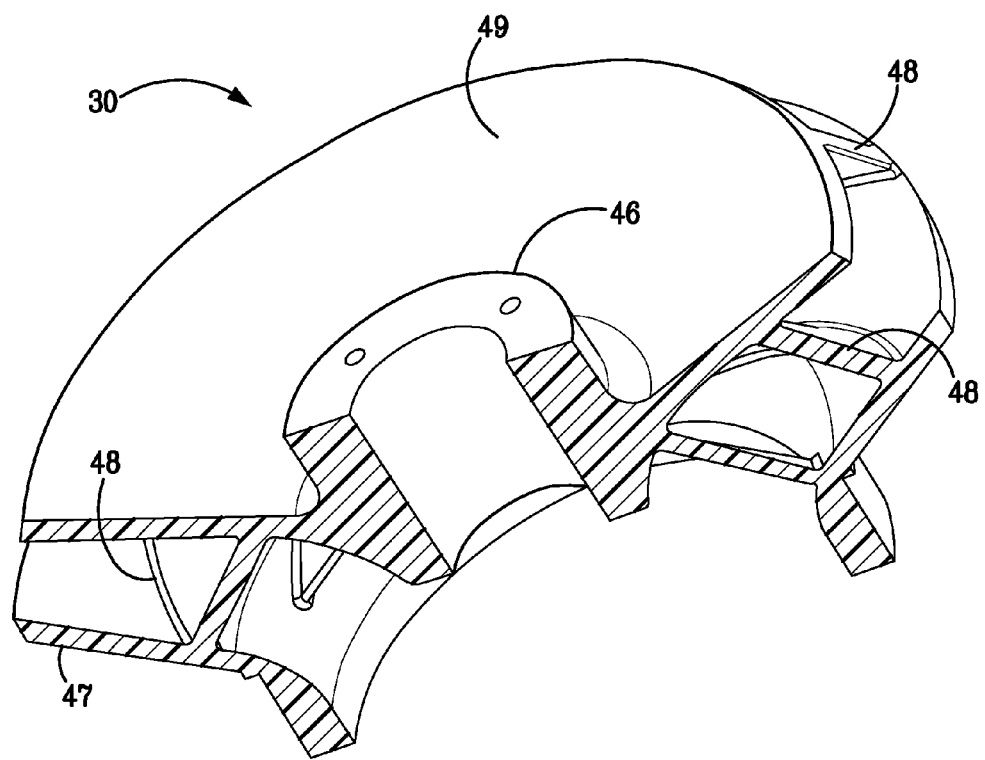
FIG. 5A is an enlarged sectional perspective view of the impeller illustrated in FIGS. 4A, B.
Figure 5B:
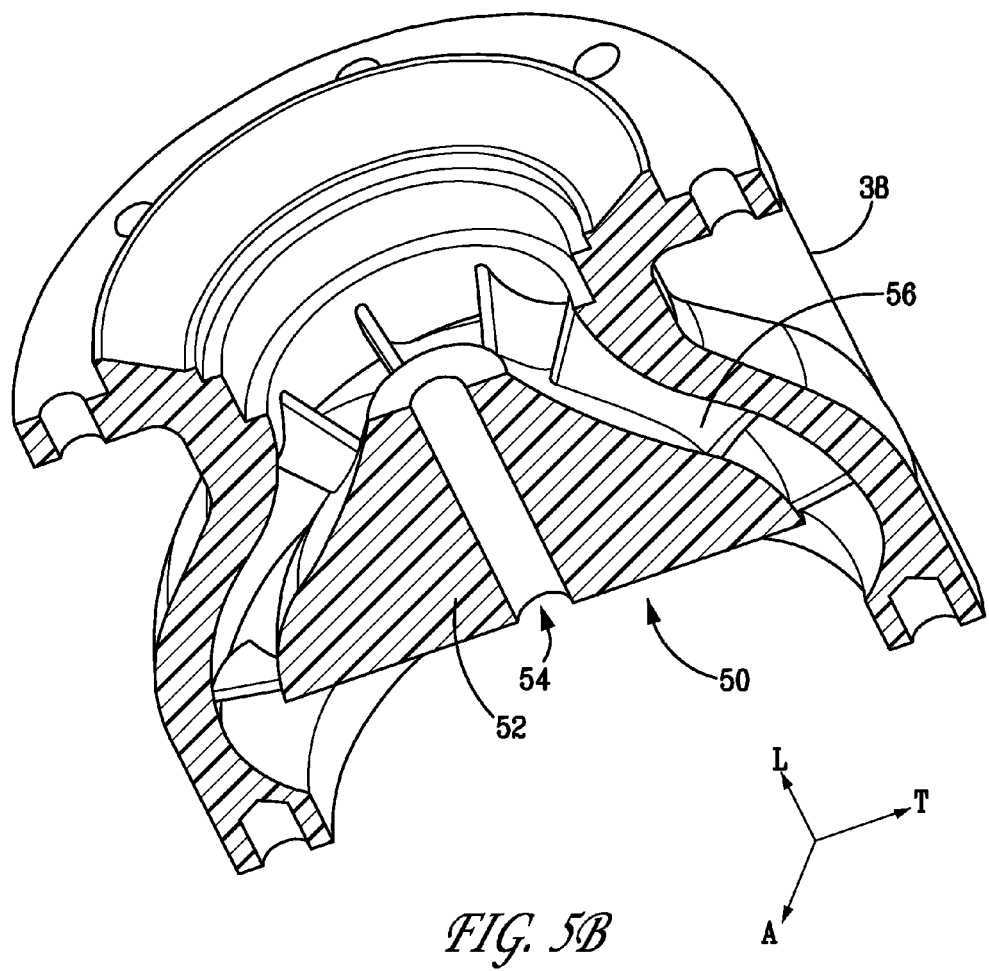
FIG. 5B is an enlarged sectional perspective view of the casing and diffuser illustrated in FIGS. 4A,B.

Referring to FIGS. 4A, 4B, and 5B, the diffuser 50 that includes a hub 52 separated from the inner surface of the casing 38 by a gap that defines a channel 54 for fluid flow through the casing 38. The diffuser 50 further includes a plurality of diffuser vanes 56 that project radially out from the hub 52 to contact or attach to or against the inner surface of the casing 38. Accordingly, fluid that is forced into the casing 38 by the impeller 30 travels through the channel 54. The diffuser vanes 56 can each be twisted so as to define a leading surface with respect to the direction of fluid flow that is twisted about a corresponding axis that is defined by a first directional component and a second directional component that is angularly offset with respect to (for instance perpendicular to) the first directional component, wherein the first directional component is defined by the longitudinal L-axis, and the second directional component is defined by a direction substantially perpendicular to the L-axis, and can thus be referred to as mixed flow vanes. The diffuser vanes 56 can further increase in surface area along the proximal direction of fluid flow through the channel 54. Thus, during operation, the diffuser vanes 56 are configured to decrease the velocity of the fluid flow through the casing 38, which increases head pressure. The fluid is thus driven to flow through the casing 38 and the discharge pipe 32, which is pressurized by the rotation of the impeller 30 during operation, and out the elbow 33.

Figure 6A:
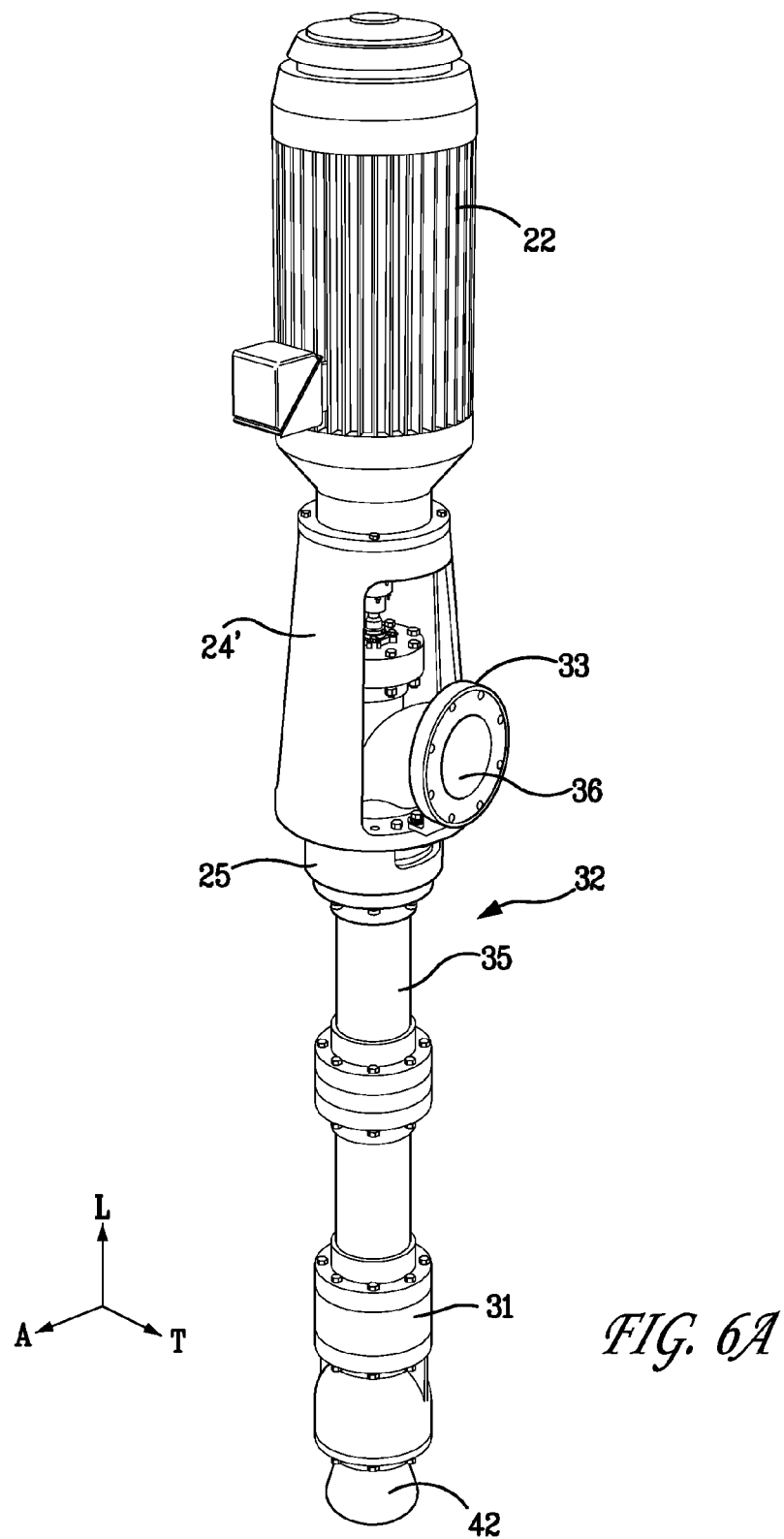
FIG. 6A shows a vertical turbine pump in accordance with one embodiment.

While the vertical turbine pump 20 has been described in connection with one embodiment, it should be appreciated that vertical turbine pumps can be constructed in accordance with alternative embodiments. For instance, the motor support 24 can be constructed as desired. Furthermore, as illustrated in FIG. 6A, the vertical turbine pump 20 can have a motor support 24' that is modified with respect to the motor support 24 illustrated in FIGS. 1A-B. For instance, the motor support 24' can be devoid of a mounting plate 26.

Figure 6B:
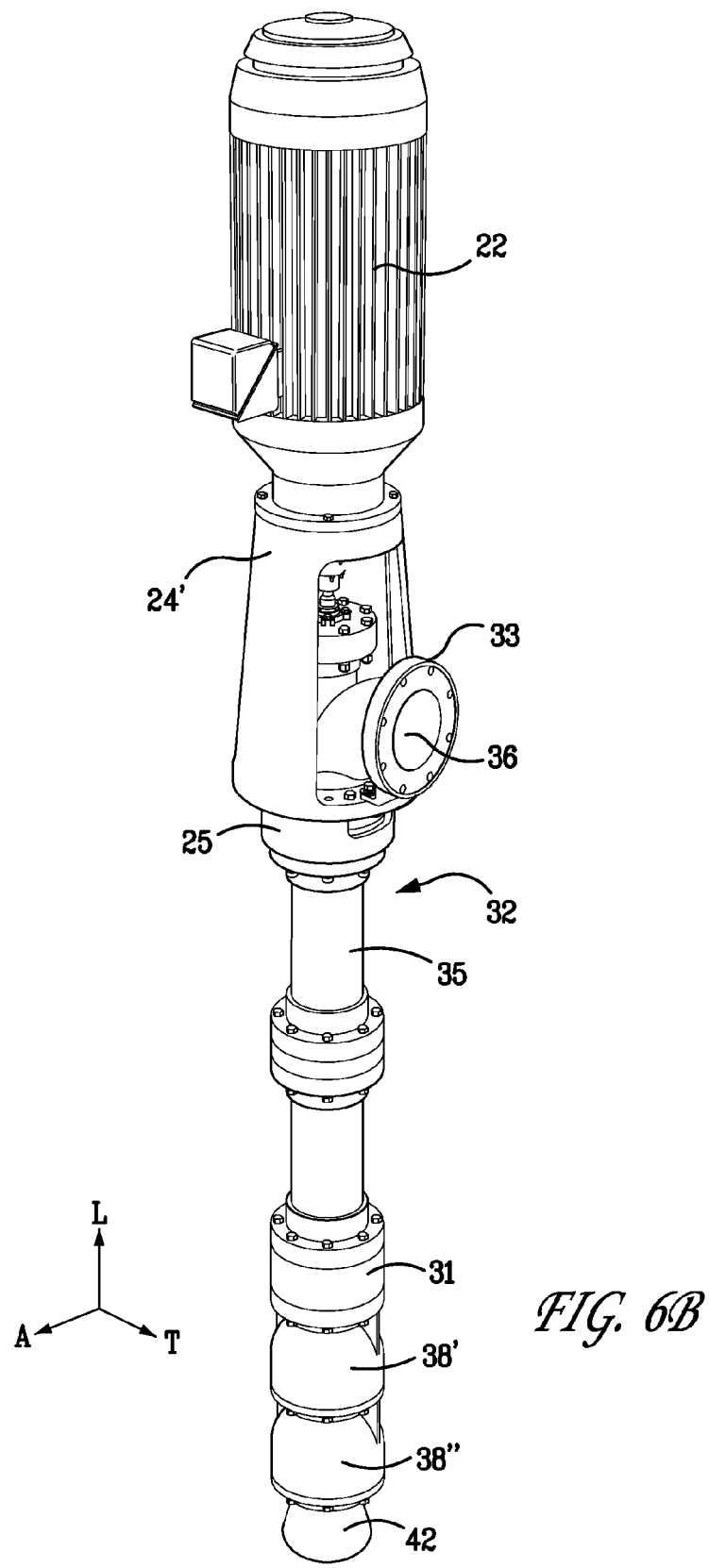
FIG. 6B shows a vertical turbine pump in accordance with another embodiment.
Figure 7:
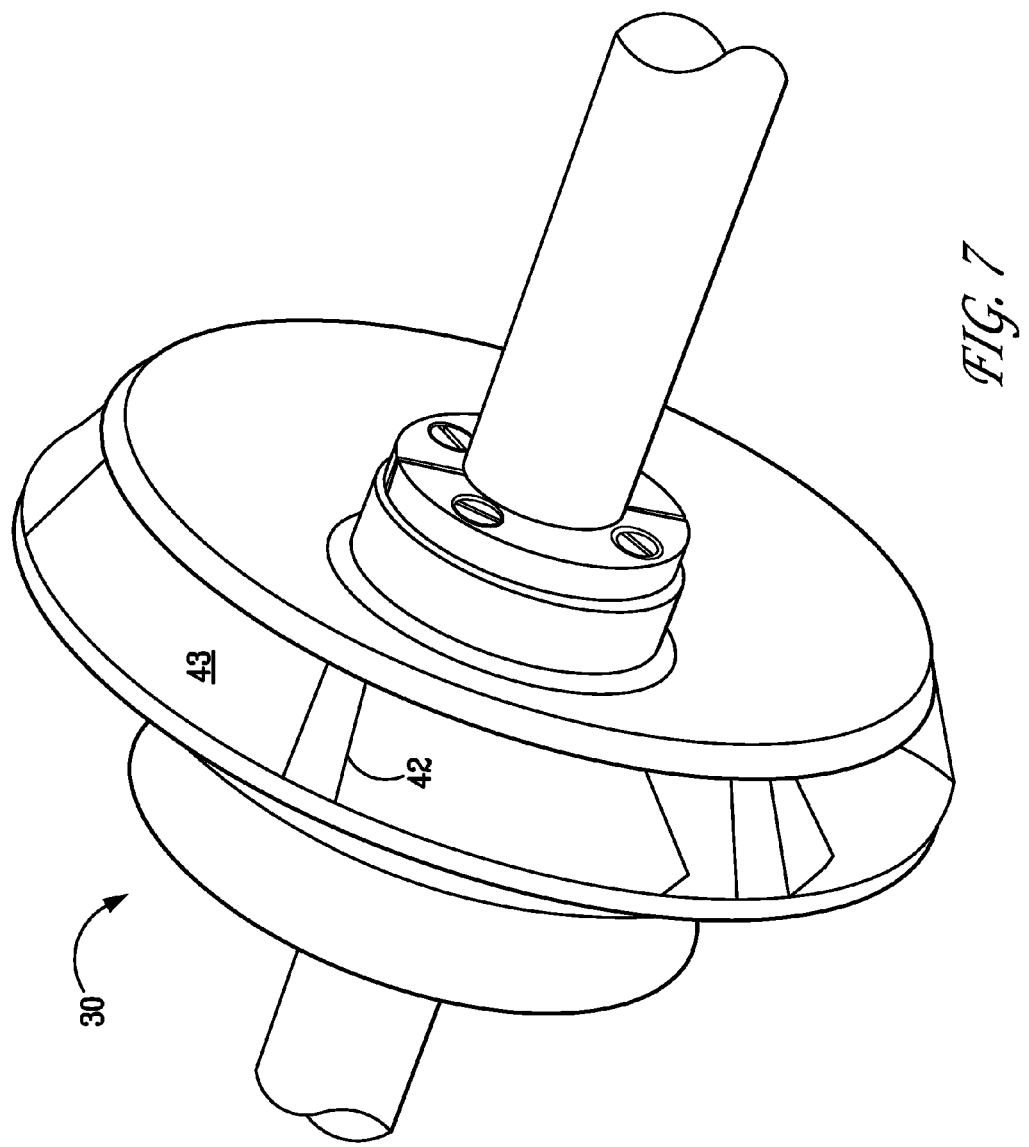
FIG. 7 is a perspective view of an as-molded homogenous impeller mounted onto a drive shaft in accordance with one embodiment.

Referring to FIG. 6B, the vertical turbine pump 20 can be constructed in accordance with another alternative embodiment, and for instance can include a plurality of casings, for instance two casings 38' and 38", that are connected in series and spaced along the longitudinal direction L. Each casing 38' and 38" includes an integral diffuser and houses an impeller of the type described herein. During operation of the pump 20, the connection of multiple casings 38 and impellers 30 in series can produce higher pressure in the fluid being pumped than a single casing and impeller. It will be appreciated that the vertical turbine pump 20 in accordance with other embodiments can include any number of casings as desired, for instance three or more casings, connected in series. Such embodiments can further include integral diffusers and house impellers in each casing. By using two or more casings and impellers in series, the pressure of fluid flowing through the vertical turbine pump 20 is increased.

In accordance with one aspect of the present invention, it is recognized that it is desirable to manufacture the vertical turbine pump 20 out of a non-metallic and thus non-corrosive material, such as fiberglass. It is recognized that conventional molding techniques include resin transfer molding (RTM) and compression molding. In RTM, reinforcing fibers, such as fiberglass, are oriented prior to the injection of resin into the mold, thereby increasing the strength of the molded component in the direction of fiber orientation. In compression molding, the orientation of the reinforcing fibers is generally less controlled or uncontrolled, thus causing the compression-molded component to have a greater thickness than a like RTM-molded component having a given strength. Accordingly, because RTM-molded components can be fabricated thinner than like compression-molded components, a manufacturing process is described below with respect to RTM, though it should be appreciated that the present invention is not limited to RTM, and can include compression molding or any suitable alternative fabrication techniques readily understood by one having ordinary skill in the art.

In conventional RTM manufacturing, the molded component is removed from the mold along a direction by separating the dies. However, in order to construct the impeller vanes 48 and the diffuser vanes 56 that are twisted both axially and radially, a mold core having a shape that is the inverse of the molded component is disposed inside the mold cavity. Unfortunately, a reliable core material has not been feasible for use in manufacturing the components of the vertical turbine pump 20. For instance, while it is well known that mold cores can be made out of materials that include ceramic, alloy materials having a low melting point, and wax, it has been found that although ceramic exhibits the desired strength to support the reinforcing fibers and maintain its structural integrity during the molding process, the ceramic is stronger than the injected resin. Accordingly reliable removal of the ceramic core from the molded component has not been feasible since it results in destruction of the molded part The present inventors have recognized that alloy materials, such as bismuth, exhibit low melting points (e.g., lower than that of the injected resin), and thus can be melted and removed from the molded component. However, the weight of bismuth is almost three times heavier than the injected resin, and thus causes the molded structure to be overly heavy and cumbersome prior to the removal of the core. In addition, low melting point alloys are difficult to both machine and retain the desired shape after machining. Bismuth, for example, expands upon cooling. Finally, any unmelted or hard bismuth could damage the pump if present during start-up or operation. The present inventors further recognize that while wax cores are commercially available, conventional waxes do not have the desired strength that can withstand forces generated during RTM or compression molding. For instance, the present inventors have found that as the resin is compressed inside the core during compression molding, the wax cores experienced structural failure. Likewise, the present inventors discovered that when using an RTM process, wax cores break when the reinforcing fibers were compressed against the core.

The present inventors have recognized that "Blue Blend" machinable wax, a wax commercially available from Machinable Wax.com, Lake Ann, Mich., has a high strength that is feasible in an RTM process. The "Blue Blend" wax has a Specific density of 0.035 pounds/cubic inch, hardness of 50-55 (Shore D scale), flash point of 575° F., softening point of 226° F., a drop melting point of 227° F., a 5% volumetric shrinkage rate and is considered by present inventors to be carveable.

Figure 8A:
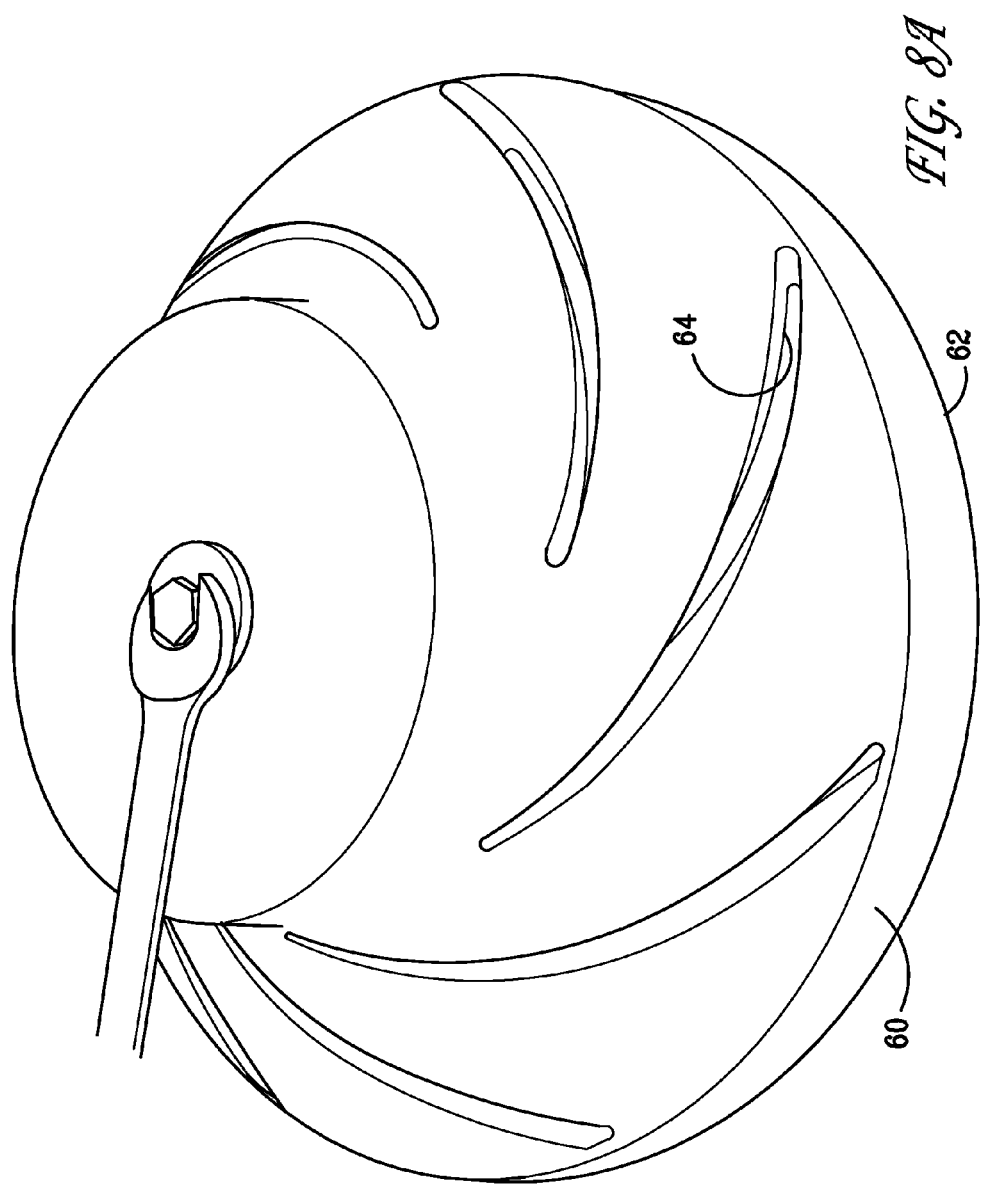
FIG. 8A is a perspective view of a core configured to produce the molded homogenous impeller illustrated in FIG. 7.

Referring to FIG. 8A, the wax can be molded to a desired wax structure 60 having shape suitable to provide a mold core 62 that is disposed inside a mold cavity so as to facilitate fabrication of the RTM-fabricated impeller 30. Thus, the mold core 62 can be defined by the desired wax structure 60. In particular, the mold core 62 defines an inverse structure of the impeller 30, such that solid regions of the mold core 62 defines open regions or air pockets of the impeller 30 that are material-free, while open regions or air pockets defined by the mold core 62 defines solid structure of the impeller 30. In accordance with the illustrated embodiment, the wax structure 60 is molded to the shape of a bowl having a central hub 63 at one end. In order to prevent cracking as the wax structure 60 cools, mold dies that define the shape of the wax structure 60 can be made of silicon rubber. Silicon rubber minimizes dissipation of heat as the wax structure 60 hardens during fabrication of the wax structure 60. Multi-axis computer numerical control (CNC) machines can mill or otherwise machine cutouts 64 in the wax structure 60 that are in the shape of the impeller vanes 48.

Figure 8C:
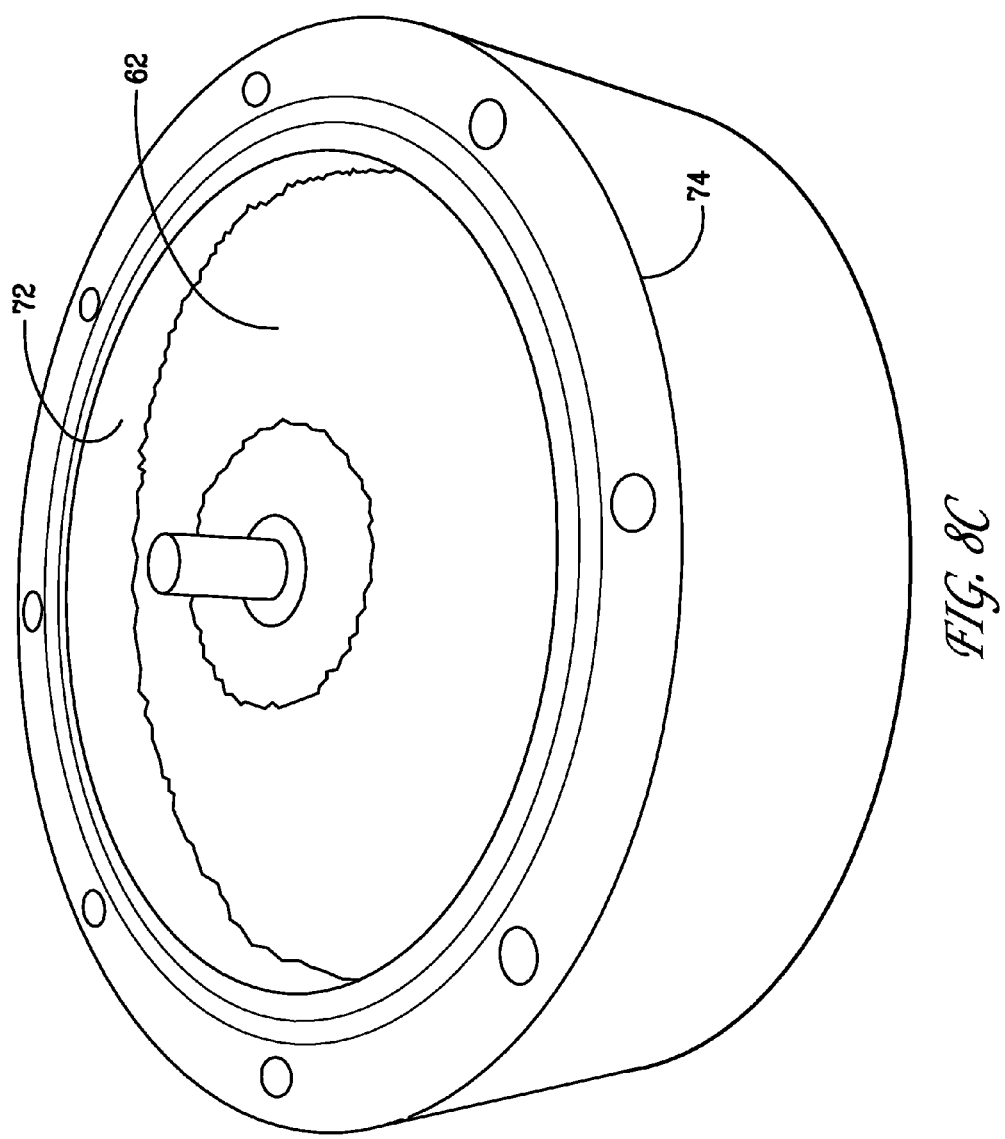
FIG. 8C is an illustration of the core and fiberglass fibers disposed in a mold cavity.
Figure 8E:
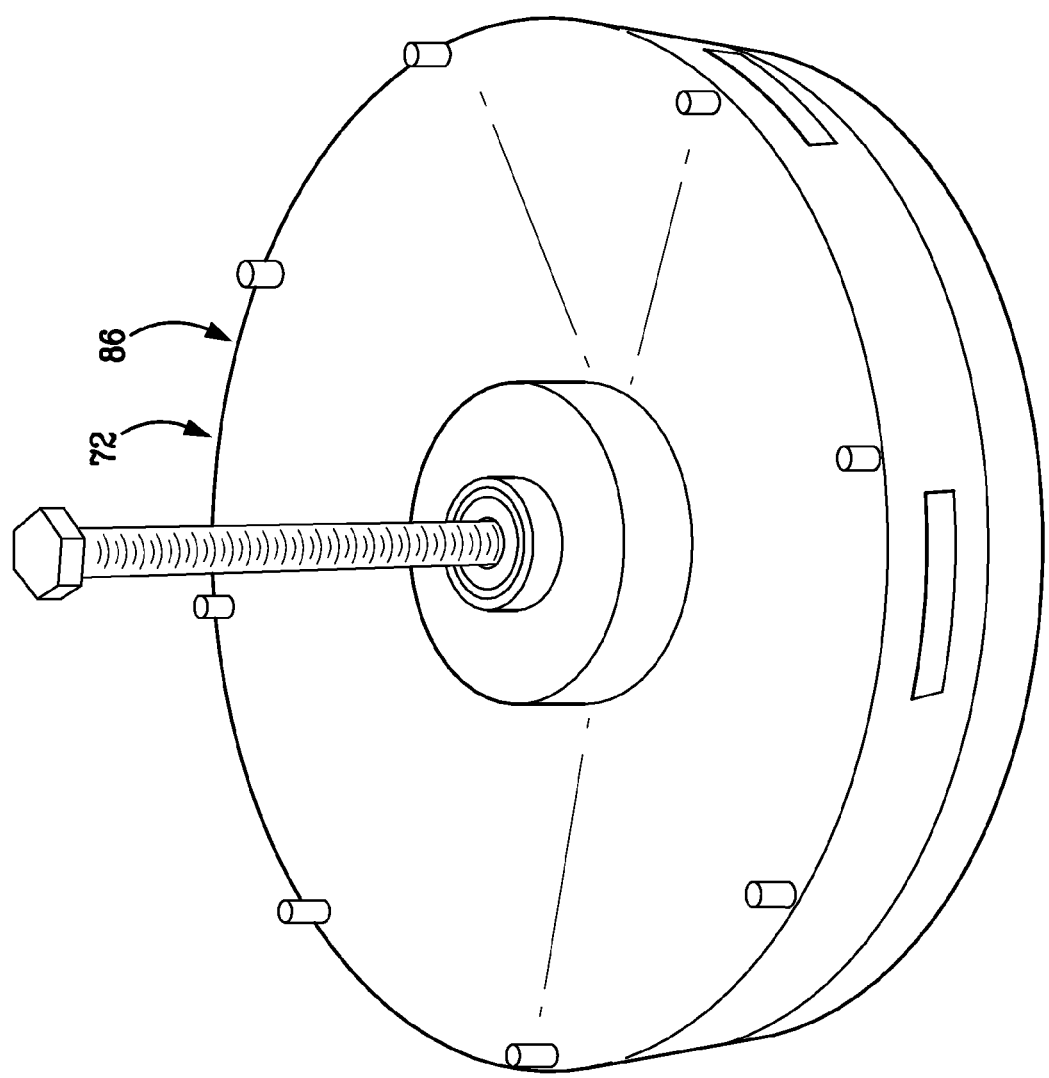
FIG. 8E is a perspective view of the molded construct illustrated in FIG. 8D, removed from the mold cavity.

Referring to FIG. 8B, the reinforcing fibers 70, such as fiberglass fibers, are oriented along a desired direction, placed along the upper and outer surfaces of the mold core 62, and are inserted through the cutouts 64. As shown in FIGS. 8C-D, the fiberglass-carrying core 62 is placed into a mold cavity 72 that is defined between a pair of mold dies (one die 74 shown), and a resin 76 is injected into the mold cavity 72 to form an intermediate structure 78 that includes a solid homogenous composite structure 80 that includes the resin 76 and the reinforcing fibers 70 carried by the mold core 62. The homogenous composite structure 80 is a fiberglass-reinforced resin in accordance with the illustrated embodiment, and includes the resin 76 and embedded reinforcing fibers 70 such that the resin and fiber are integrally bound and uniform throughout. Once the composite structure 80 hardens, the mold dies can be separated to reveal the hardened composite structure 80 as illustrated in FIG. 8E. The composite structure 80 can be shaved about its periphery to remove resin 76 that is disposed about the periphery of the mold core 62 as illustrated in FIG. 8F.

Figure 9B:
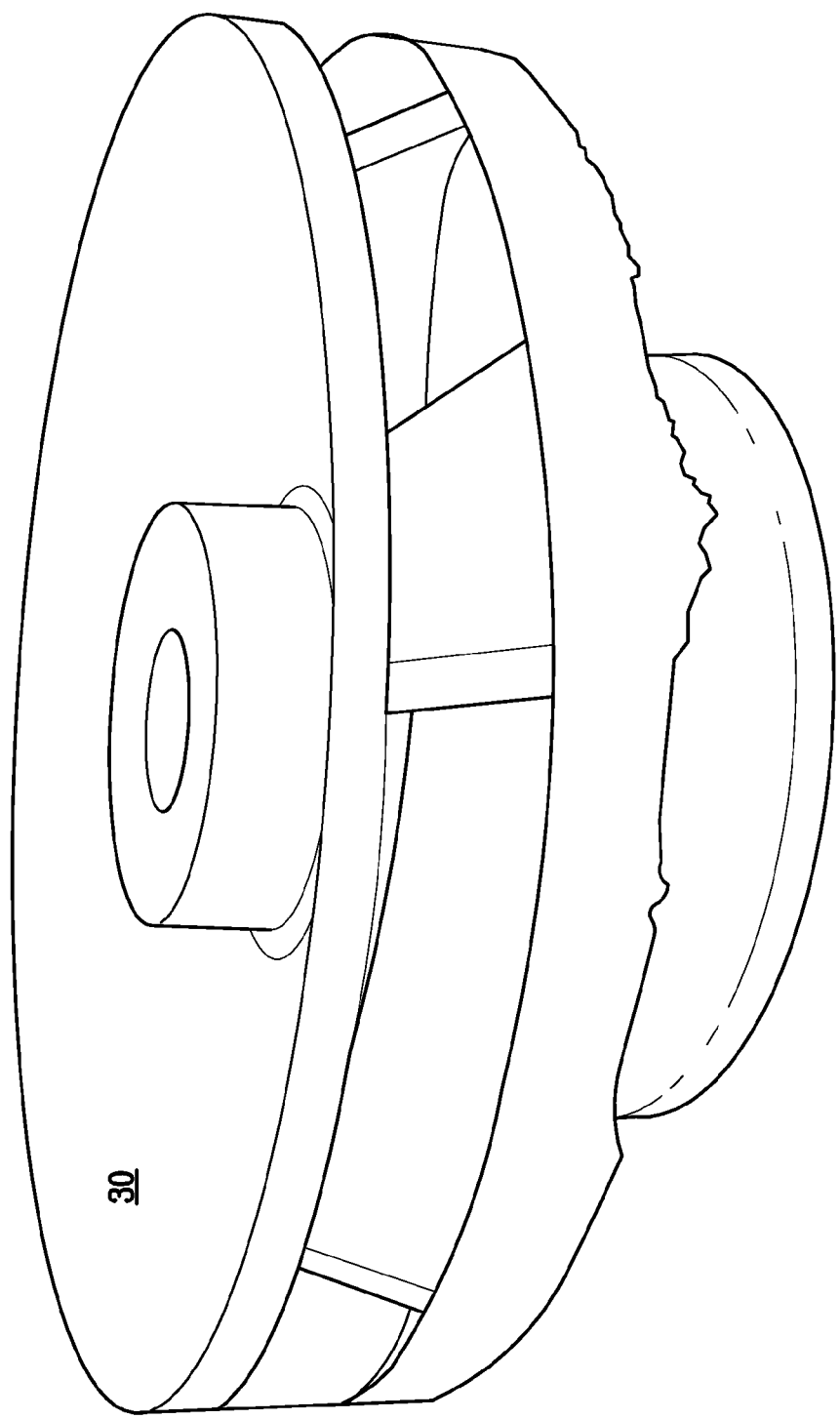
Figure 9C:
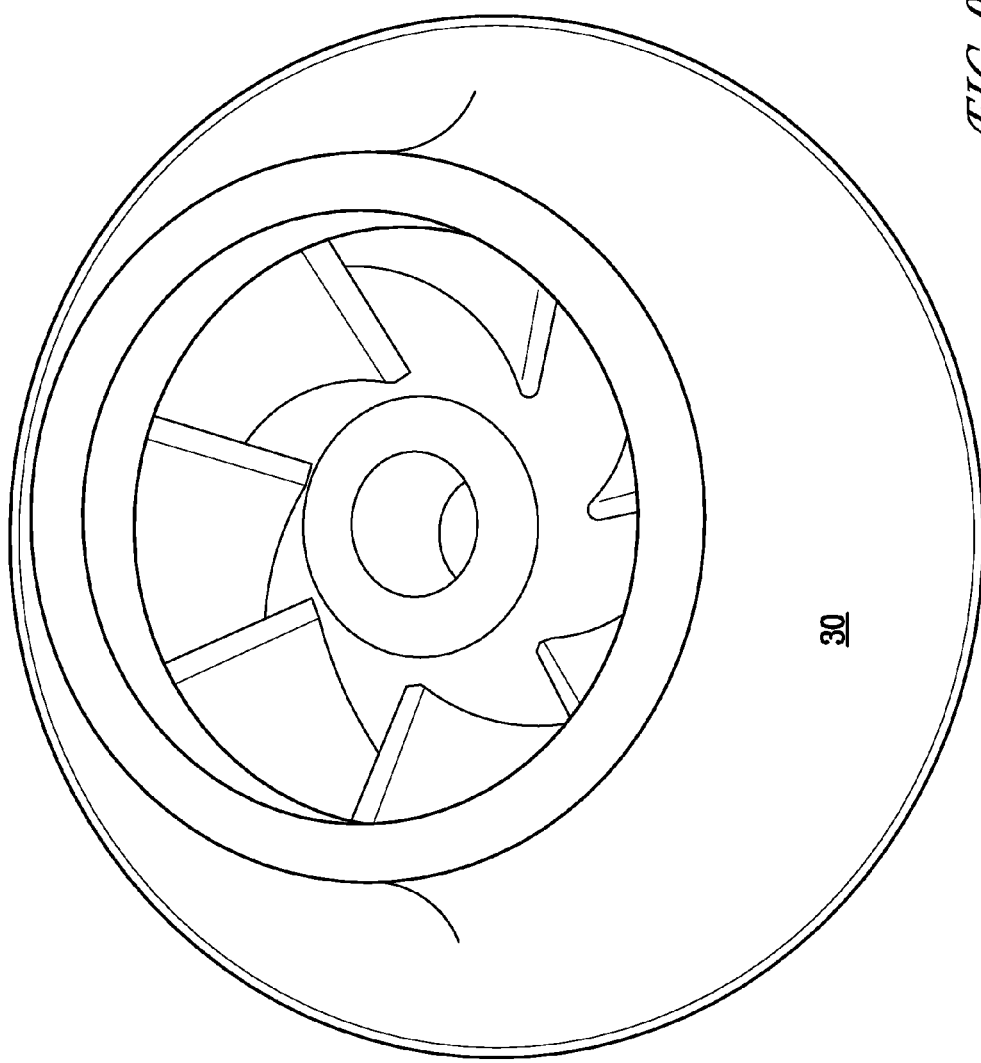

The resin 76 can be any non-corrosive resin such as a vinyl-ester, epoxy, or any alternative suitable resin as desired. In accordance with one embodiment, the composite structure 80 has a melting point greater than that of the wax mold core 62. In accordance with the illustrated embodiment, the wax mold core 62 is melted at any temperature greater than 227° Fahrenheit, for instance approximately 267° Fahrenheit, while the resin 76 and composite structure 80 have a melting point greater than 350° Fahrenheit. The mold core 62 further exhibits a Specific Density greater than 0.034 pounds/cubic inch and a Hardness between 50-55 Shore D. Thus, as illustrated in FIGS. 9A-C, the intermediate structure 78 can be subjected to heat greater than the melting point of the mold core 62, but less than that of the composite structure 80 so as to remove the mold core 62 from the composite structure 80 and produce the impeller 30. Specifically, in accordance with the illustrated embodiment, the intermediate structure 78 may be heated so as to cure the resin and melt the wax mold core 62, thereby removing the core 62 from the composite structure 80. Curing the composite structure 80 can require heating of over 200° Fahrenheit, so the intermediate structure 78 can be heated so as to both cure the composite structure and simultaneously melt the wax core 62. The wax mold core 62 flows out of the intermediate structure 78, leaving the molded impeller 30. Residual wax that remains on the impeller 30 after the wax core 62 is melted can be flushed out of the pump 20 during operation. Unlike bismuth, residual wax is soft enough such that the residual wax does not damage the vertical turbine pump 20 during normal operation.

Figure 10A:
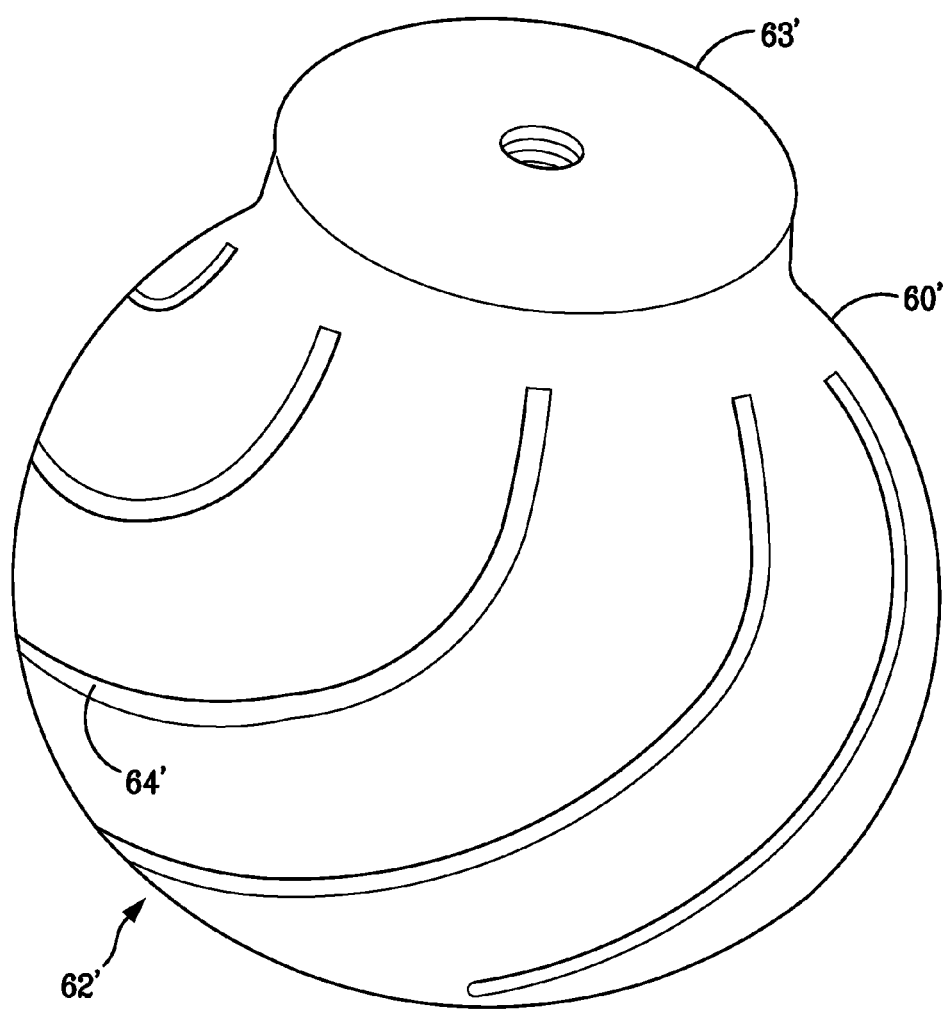
FIGS. 10A-C are perspective views of a mold core configured to be used in the fabrication of the diffuser.
Figure 10B:
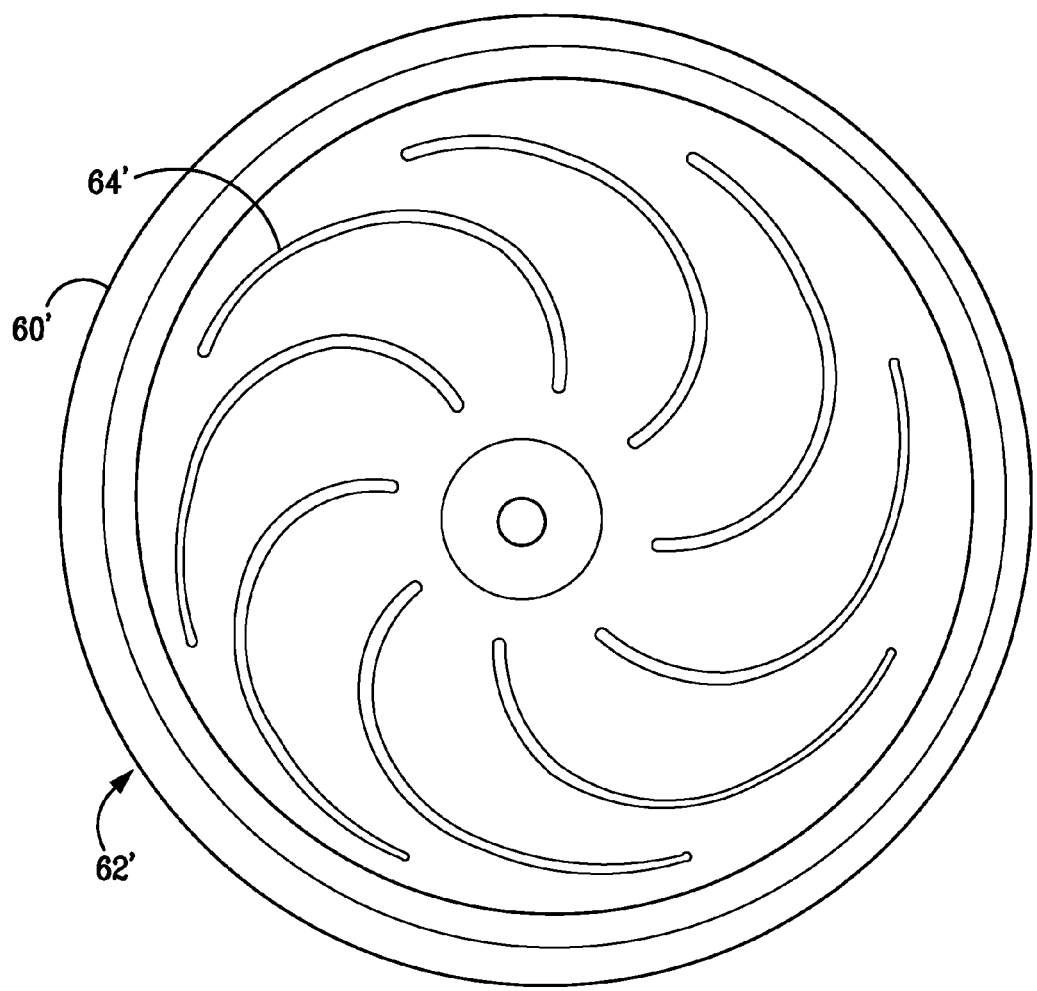
Figure 10C:
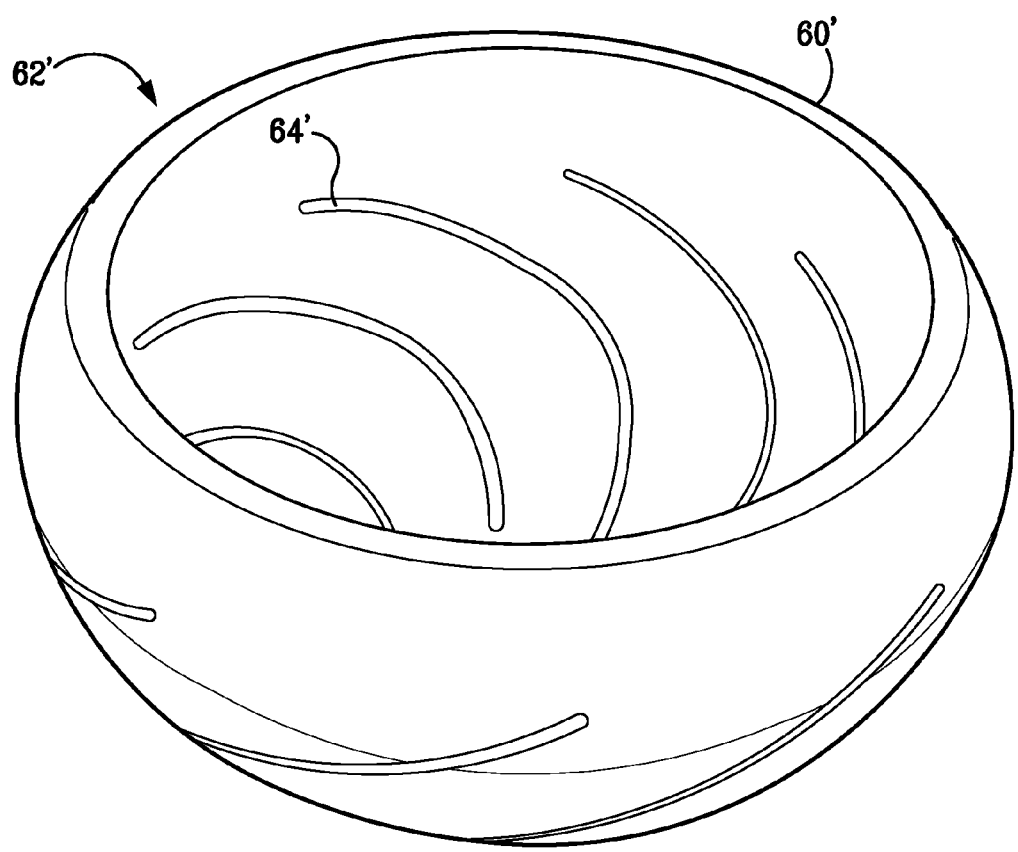

Referring to FIGS. 10A-C, a casing core wax structure 60' can be manufactured in a similar manner to that described above with respect to the wax structure 60 that provides the mold core for construction of the impeller 30. In particular, in addition to the use of a silicon rubber mold, a heat lamp can also be employed to prevent the hardening of the wax at the open end of the mold prior to hardening of the wax at the base of the mold. For instance, the wax mold core 62 can have a thickness that increases from the closed portion to the open end. This technique allows the wax to cool slowly, along a direction from the closed portion of the mold core 62 (e.g., the base of the mold core 62) toward the open end of the mold core 62, thereby minimizing the possibility of forming cracks in the wax during cooling.

The wax structure 60' can thus provide a casing mold core 62' that is manufactured as described above with respect to the mold core 62, but is configured to manufacture the casing 38 with its integral diffuser 50. For instance, the mold core 62' defines an inverse structure of the casing 38, such that solid regions of the mold core 62' defines open regions or air pockets of the casing 38 that are material-free, while open regions or air pockets defined by the mold core 62' defines solid structure of the casing 38. Thus, the mold core 62' has the shape of a casing that has a shape higher than the mold core 62 that corresponds in shape to the impeller 30, and defines a greater circumference than that of the mold core 62. Multi-axis computer numerical control (CNC) machines can mill or otherwise machine cutouts 64' in the wax structure 60' that are in the shape of the diffuser vanes 56. Accordingly, and the resin is injected into the mold cavity and allowed to harden, and the mold core 62' is removed in the manner described above so as to produce the with respect to the mold core and produce the casing 38 with its integral diffuser 50.

Figure 10D:
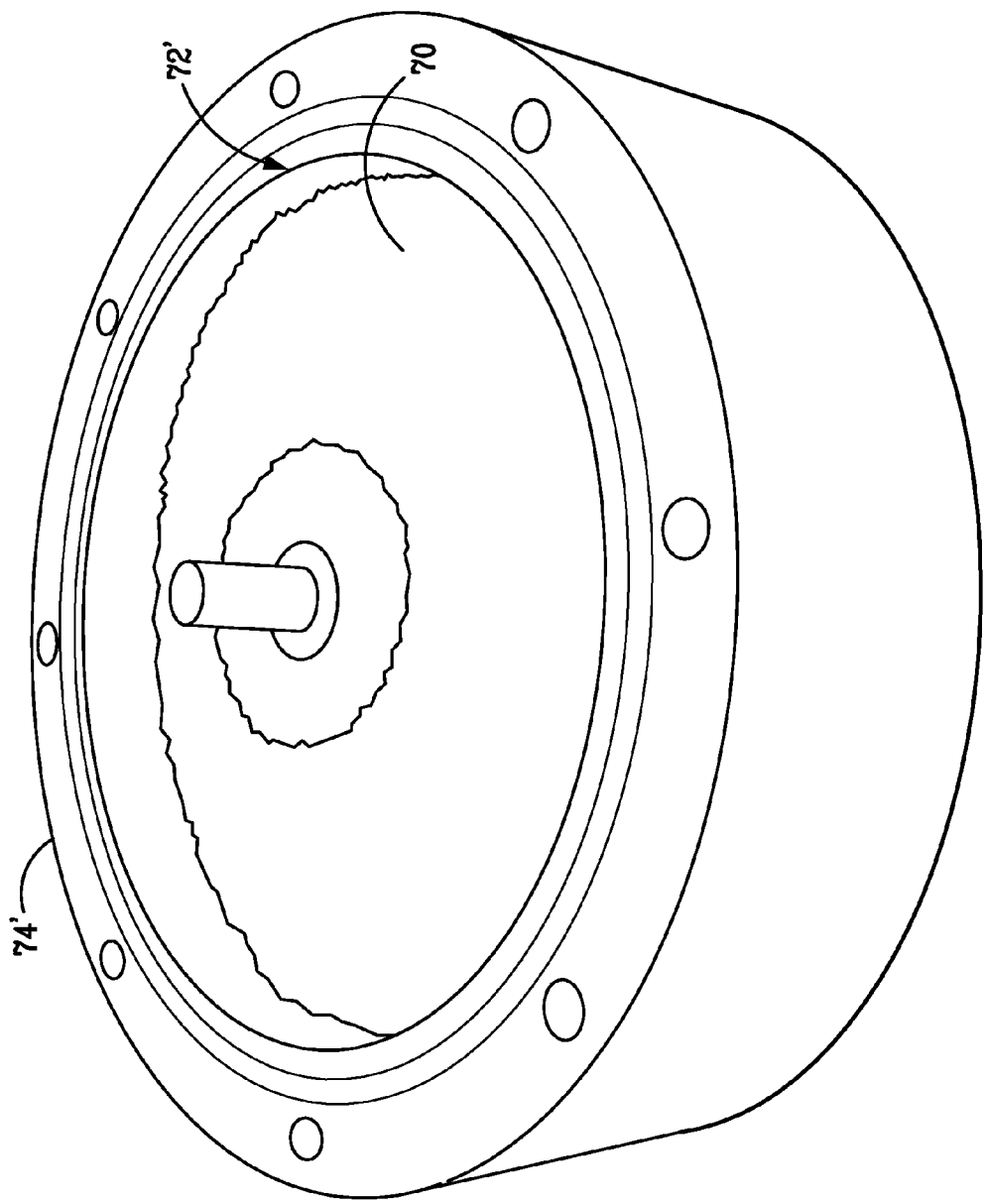
FIG. 10D is an illustration of the mold core and fiberglass fibers disposed in a mold cavity used in the fabrication of the diffuser.
Figure 10E:
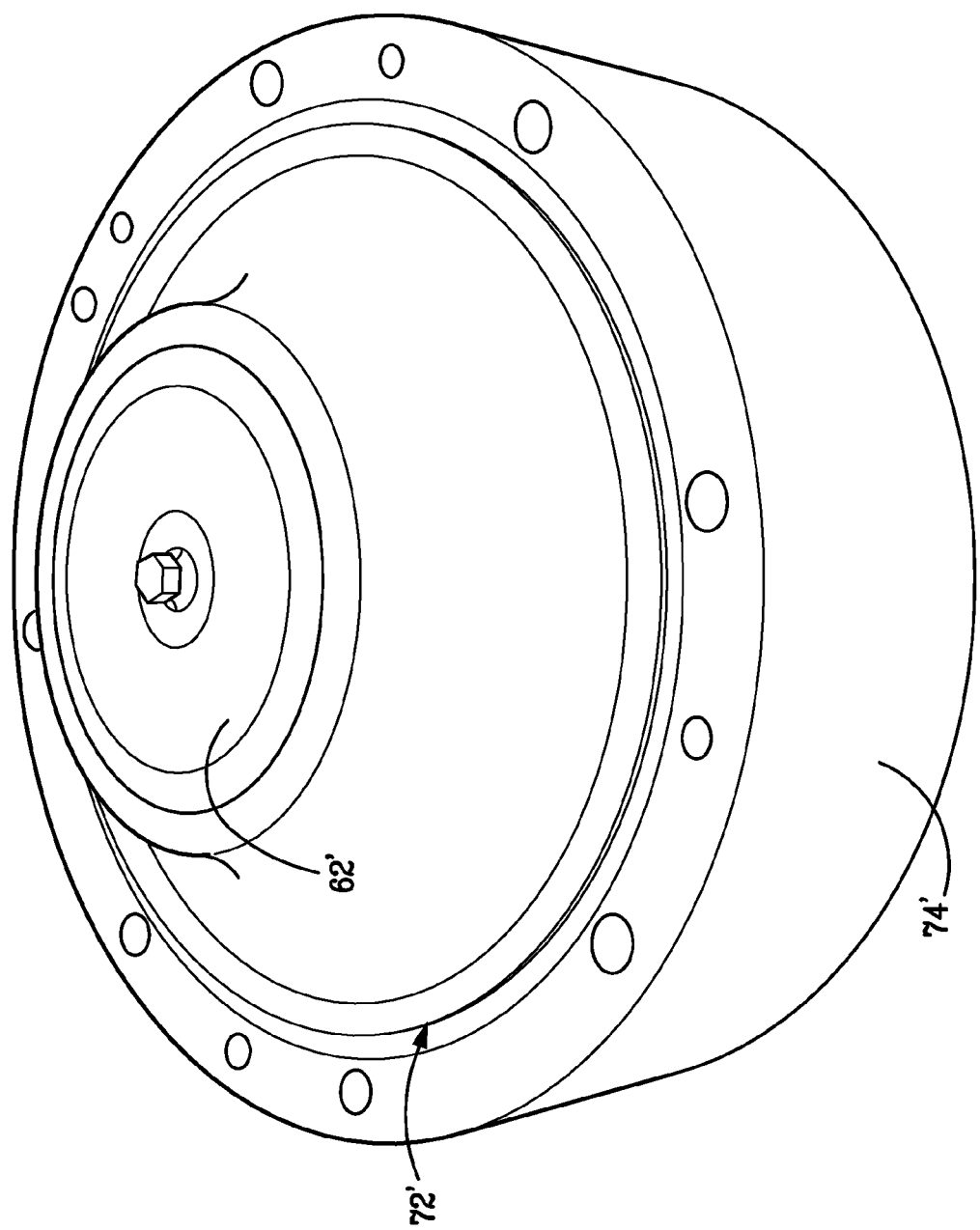
FIG. 10E is a perspective view of a molded construct after the introduction and hardening of a resin inside the mold cavity used in the fabrication of the diffuser.

The reinforcing fibers 70 are placed around and in the mold core 62'. As shown in FIG. 10D, the fiberglass-carrying core 62' can be placed into a mold cavity 72' that is defined between a pair of mold dies (one die 74' shown). FIG. 10E shows the mold die after a resin 76 has been injected into the mold cavity 72' to form an intermediate structure (not shown) that includes a solid homogenous composite structure that includes the resin 76 and the reinforcing fibers 70 carried by the mold core 62'. Once the composite structure has hardened, the mold core 62' can be removed in the manner described above in relation to composite structure 78 so as to produce the with respect to the mold core and produce the casing 38 with its integral diffuser 50.

It should be appreciated that both the molded impeller 30 and casing 38 are homogeneous one piece solid components. That is, the parts of each component are fabricated as a single integral structure, free of joints in the form of glue, non-molded resin, bolts, fasteners, or other discrete connections. For instance, the impeller vanes 48 are integrally connected to both the front and back shrouds 47 and 49. Likewise, the diffuser vanes 56 are integrally connected to the diffuser hub 52.

Figure 11A:
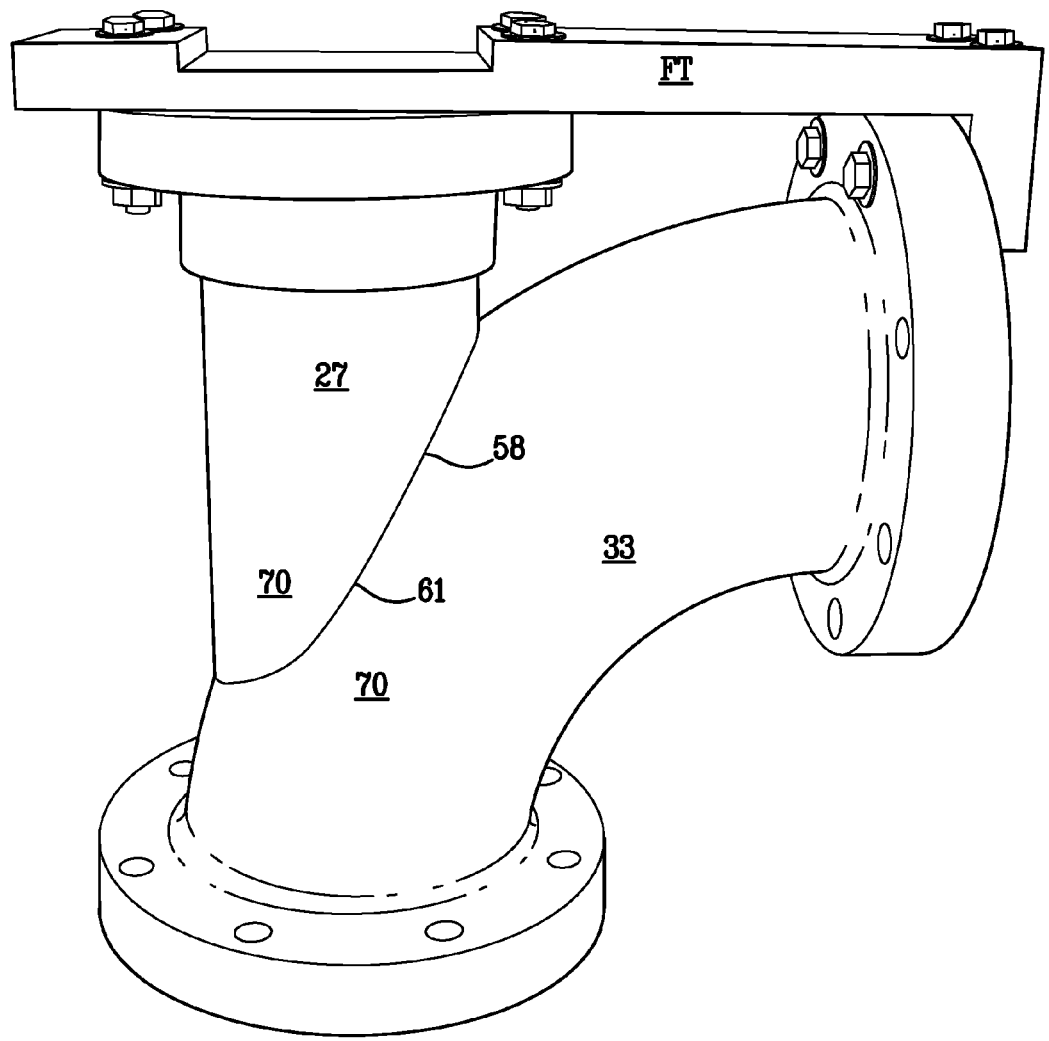
FIGS. 11A-C are perspective views of the fabrication of the non-metallic discharge elbow and stuffing box flange of the vertical turbine pump.
Figure 11B:
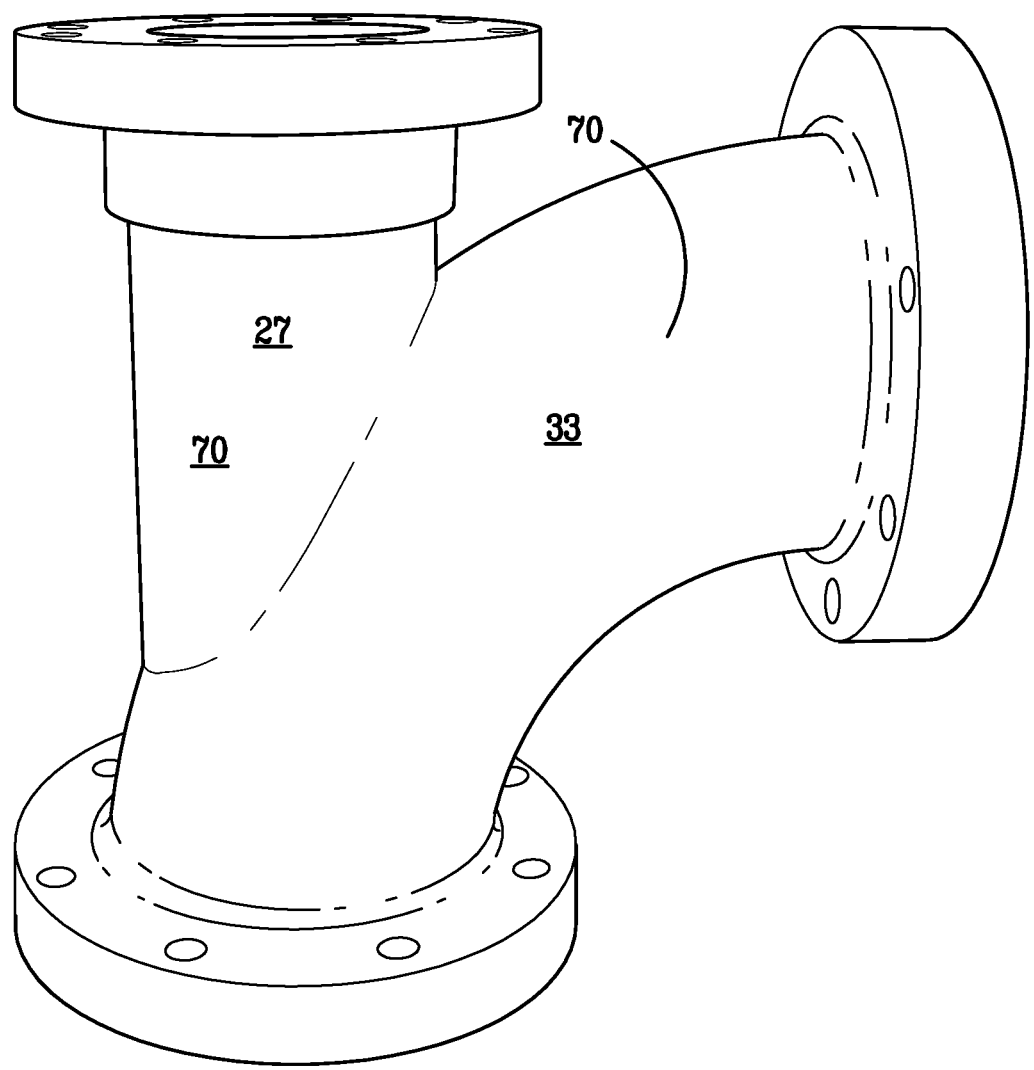
Figure 11C:
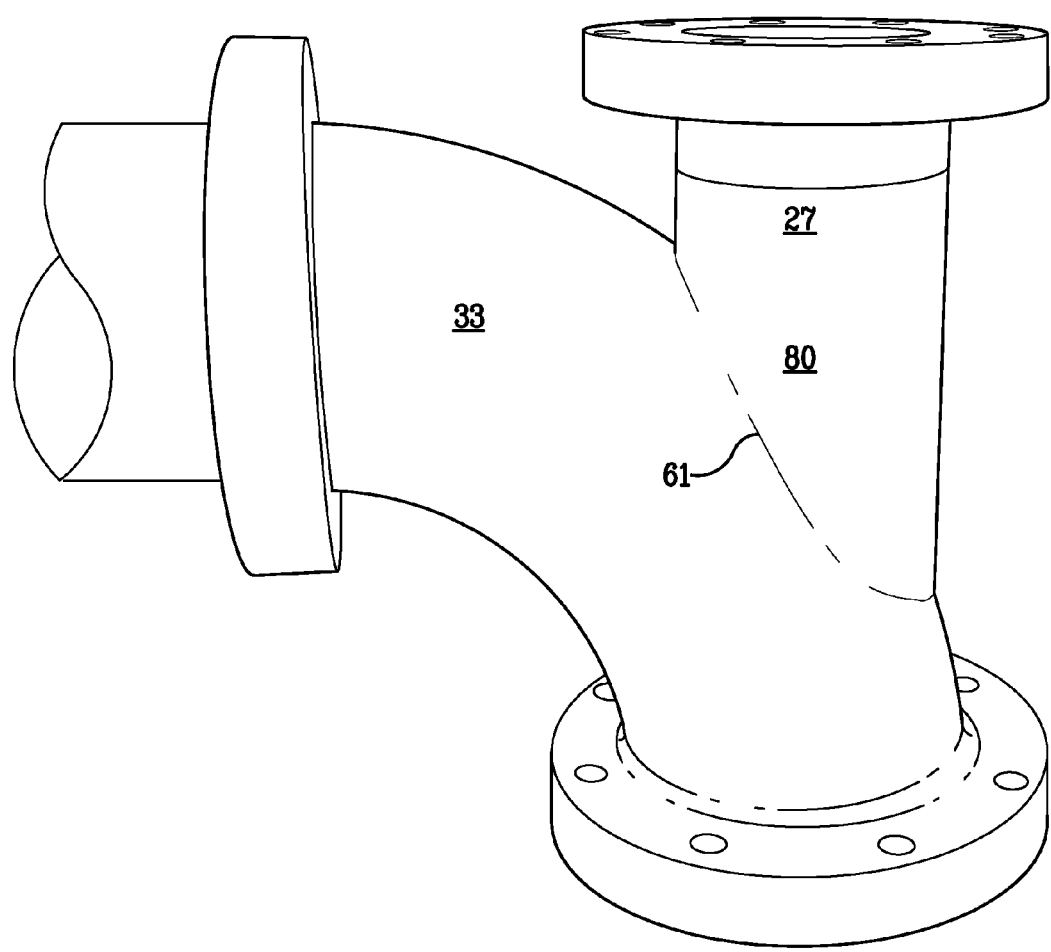

Referring now to FIG. 11A, the joint 61 between the elbow 33 and the stuffing box support 27 can be fabricated such that the shaft opening 58 receives the downwardly extending stuffing box support 27. These two pipes are joined utilizing hand layup techniques for fiberglass reinforced piping to create a non-typical pipe tee. Specifically, the centerlines of the elbow 33 and the stuffing box support 27 can be aligned using a fabrication tool such as element FT. Once the elbow 33 and stuffing box support 27 are in alignment, a second non-metallic material, for example, reinforcement fibers 70, such as fiberglass sheet can be hand oriented along the outer surface of the elbow 33 and the outer surface of the stuffing box 37 across the joint 61 to cover joint 61 as illustrated in FIG. 11B. If fiberglass sheet is used, the fibers 70 can be aligned lengthwise along the stuffing box support 27 and the elbow 33 to provide stability to the joint 61. Subsequent placement of the fibers 70, resin can be coated onto the outer surfaces of the elbow 33, the stuffing box support 27 and also across the joint 61. Because the resin is also coated onto the fibers 70, it can be said that the outer surface of the elbow 33 and the stuffing box support 27 are made from the composite material 80. Furthermore, it can be said that the outer surfaces of the elbow 33 and the stuffing box support 24 are homogenous.

The embodiments described in connection with the illustrated embodiments have been presented by way of illustration, and the present invention is therefore not intended to be limited to the disclosed embodiments. Furthermore, the structure and features of each the embodiments described above can be applied to the other embodiments described herein, unless otherwise indicated. Accordingly, those skilled in the art will realize that the invention is intended to encompass all modifications and alternative arrangements included within the spirit and scope of the invention, for instance as set forth by the appended claims.

What is claimed is:

1. A vertical turbine pump that is elongate along a longitudinal direction, the vertical turbine pump comprising:
   a motor, and a drive shaft rotatably coupled to the motor such that rotation of the motor causes the drive shaft to rotate;
   a casing defining an inner surface;
   a mixed flow diffuser including a diffuser hub that is spaced from the inner surface of the casing, the diffuser further including a plurality of mixed flow diffuser vanes that project out from the diffuser hub to the inner surface of the casing and are twisted so as to define a surface that is curved in a direction that includes a directional component in both the longitudinal direction and a direction substantially perpendicular to the longitudinal direction; and
   a mixed flow impeller configured to rotatably fit inside the casing, the mixed flow impeller having an impeller hub, impeller vanes, extending from the hub along a direction that includes directional components in both the longitudinal direction and a direction substantially perpendicular to the longitudinal direction, and a front and a back shroud connected to opposed ends of the impeller vanes,
   wherein the diffuser hub, the mixed flow diffuser vanes, and the casing, in combination, are made of a non-metallic material that is a fiberglass reinforced singular monolithic component formed in a singular mold cavity.

2. The vertical turbine pump of claim 1 wherein the pump includes a discharge head including a discharge column, an elbow and a stuffing box holder that extends into the elbow at a joint; and a second non-metallic material that is fiberglass reinforced and that covers the joint.

3. The vertical turbine pump of claim 1, wherein the singular mold cavity is a first singular mold cavity and the mixed flow impeller hub, impeller vanes, and front and back shrouds are made of a fiberglass reinforced singular monolithic component formed in a second singular mold cavity.

4. The vertical turbine pump as recited in claim 1, wherein the fiberglass is oriented so as to bond to the non-metallic material.

5. The vertical turbine pump as recited in claim 1, wherein the non-metallic material is a resin.

6. The vertical turbine pump as recited in claim 5, wherein the resin comprises vinyl-ester or epoxy.

7. The vertical turbine pump as recited in claim 1, wherein the diffuser vanes extend from the diffuser hub to respective tips that are made of the nonmetallic material that is fiberglass reinforced and the tips are integral with the casing.

8. A mixed flow impeller for a vertical turbine pump, comprising:
an impeller hub configured to rotate about an axis of rotation;
a plurality of mixed flow impeller vanes extending out from the hub, each of the impeller vanes twisted so as to be curved about an axis that is defined by a first directional component and a second directional component, wherein the first directional component is defined by the axis of rotation and the second directional component is defined by a direction substantially perpendicular to the axis of rotation; and
front and back shrouds connected to opposing ends of the impeller vanes,
wherein the impeller vanes, the hub, and the front and back shrouds are all integral with each other so as to define a singular monolithic component formed in a singular mold cavity, and made of a resin and reinforcing fibers.

9. The mixed flow impeller as recited in claim 8, wherein the fibers are oriented so as to bond to the resin.

10. The mixed flow impeller as recited in claim 8, wherein the resin comprises vinyl-ester or epoxy.

11. A vertical turbine pump component, comprising:
a diffuser hub; and
a casing having an inner surface that is spaced radially out from the diffuser hub;
the diffuser hub including a plurality of mixed flow diffuser vanes that project out from the diffuser hub to the inner surface of the casing, each of the diffuser vanes twisted so as to be curved about an axis that is defined by a first directional component and a second directional component that is substantially perpendicular to the first directional component,
wherein the diffuser hub, the mixed flow diffuser vanes, and the casing, in combination, are made of a singular monolithic component made of resin and reinforcing fibers formed in a singular mold cavity.

12. The mixed flow diffuser as recited in claim 11, wherein the fibers are oriented so as to bond to the resin.

13. The mixed flow diffuser as recited in claim 11, wherein the resin comprises vinyl-ester or epoxy.

14. The mixed flow diffuser as recited in claim 11, wherein the diffuser vanes extend from the diffuser hub to respective tips that are made of the resin and reinforcing fibers and the tips are integral with the casing.

* * * * *